US011689391B2

United States Patent
Williams et al.

(10) Patent No.: US 11,689,391 B2
(45) Date of Patent: Jun. 27, 2023

(54) SYSTEMS, METHODS AND DEVICES FOR NETWORKING OVER HIGH IMPEDANCE CABLING

(71) Applicant: Audinate Holdings Pty Limted, Surry Hills (AU)

(72) Inventors: Aidan Williams, Chifley (AU); Christopher Graham Ware, Gymea Bay (AU)

(73) Assignee: Audinate Holdings Pty Limited, New South (AU)

( * ) Notice: Subject to any disclaimer, the term of this patent is extended or adjusted under 35 U.S.C. 154(b) by 0 days.

(21) Appl. No.: 17/854,614

(22) Filed: Jun. 30, 2022

(65) Prior Publication Data

US 2023/0028357 A1 Jan. 26, 2023

Related U.S. Application Data

(63) Continuation of application No. 16/983,713, filed on Aug. 3, 2020, now Pat. No. 11,411,780, which is a
(Continued)

(51) Int. Cl.
*H04B 3/00* (2006.01)
*H04L 25/02* (2006.01)
(Continued)

(52) U.S. Cl.
CPC .......... *H04L 25/0278* (2013.01); *H04B 3/54* (2013.01); *H04L 12/403* (2013.01); *H04L 12/66* (2013.01);
(Continued)

(58) Field of Classification Search
CPC ... H04L 25/0278; H04L 12/403; H04L 12/66; H04B 3/54; H04B 2203/542;
(Continued)

(56) References Cited

U.S. PATENT DOCUMENTS 4,139,735 A 2/1979 Dorfman
6,791,453 B1 * 9/2004 Andres ................. G08B 19/00
340/506
(Continued)

FOREIGN PATENT DOCUMENTS

WO WO 2007/021895 2/2007

OTHER PUBLICATIONS

International Search Report dated Jan. 14, 2013 for PCT/AU2012/001216.
(Continued)

*Primary Examiner* — Dhaval V Patel
(74) *Attorney, Agent, or Firm* — Jones Day

(57) ABSTRACT

Systems, methods, and processor readable media for distributing digital data and electrical power to a plurality of devices over high-impedance cables are disclosed. Certain embodiments include a gateway device connected to a power source, a first device connected to the gateway device by a cable, the cable being a high-impedance cable having at least two conductive paths, and wherein the first device receives electrical power and digital data from the gateway device via the cable over the same conductive path of the cable, a second device connected to the gateway device by the cable wherein the second device receives power and digital data from the gateway device via the cable over the same conductive path, and wherein the power source provides power to the first and second devices via the cable, and wherein the second device is connected to the gateway device through the first device via a daisy-chain topology.

20 Claims, 20 Drawing Sheets

Related U.S. Application Data continuation of application No. 16/548,493, filed on Aug. 22, 2019, now Pat. No. 10,771,290, which is a continuation of application No. 14/349,546, filed as application No. PCT/AU2012/001216 on Oct. 5, 2012, now Pat. No. 10,439,848.

(60) Provisional application No. 61/544,810, filed on Oct. 7, 2011.

(51) Int. Cl.
*H04B 3/54* (2006.01)
*H04L 12/403* (2006.01)
*H04L 12/66* (2006.01)

(52) U.S. Cl.
CPC .. *H04B 2203/542* (2013.01); *H04B 2203/545* (2013.01); *H04R 2227/003* (2013.01); *H04R 2227/005* (2013.01)

(58) Field of Classification Search
CPC ........ H04B 2203/545; H04R 2227/003; H04R 2227/005
See application file for complete search history.

(56) References Cited

U.S. PATENT DOCUMENTS

| | | | |
|---|---|---|---|
| 8,232,884 B2 * | 7/2012 | Pattok | G08B 29/145 340/693.6 |
| 8,577,220 B1 | 11/2013 | Wang et al. | |
| 10,349,848 B2 | 7/2019 | Pi | |
| 10,439,848 B2 | 10/2019 | Williams | |
| 10,771,290 B2 | 9/2020 | Williams | |
| 2003/0090375 A1 * | 5/2003 | Addy | G08B 25/007 340/531 |
| 2003/0220705 A1 | 11/2003 | Ibey | |
| 2006/0072695 A1 | 4/2006 | Iwamura | |
| 2006/0187022 A1 | 8/2006 | Dawson et al. | |
| 2006/0212344 A1 | 9/2006 | Marcus | |
| 2006/0248221 A1 | 11/2006 | Hottel et al. | |
| 2006/0280182 A1 | 12/2006 | Williams | |
| 2007/0036171 A1 | 2/2007 | Magin | |
| 2007/0055394 A1 | 3/2007 | Klotz | |
| 2007/0223721 A1 | 9/2007 | Stern | |
| 2007/0223722 A1 | 9/2007 | Merrey | |
| 2007/0259644 A1 | 11/2007 | Chan et al. | |
| 2008/0022344 A1 * | 1/2008 | Riggsby | H04N 21/6118 725/128 |
| 2008/0107110 A1 | 5/2008 | Andou et al. | |
| 2008/0117922 A1 | 5/2008 | Cockrell et al. | |
| 2008/0144546 A1 | 6/2008 | Binder | |
| 2008/0250462 A1 | 10/2008 | Crohas | |
| 2009/0089456 A1 | 4/2009 | Stanton | |
| 2010/0074457 A1 | 3/2010 | Gunnars | |
| 2010/0260247 A1 | 10/2010 | Albiston et al. | |
| 2011/0018704 A1 | 1/2011 | Burrows | |

OTHER PUBLICATIONS

Cisco, "Per Interface Mrout State Limit with Bandwidth-Based CAC for IPmulticast" Jun. 20, 2007, XP0055483771, United States, ISBN 978-0-07-212115-5. Retrieved from Internet: URL:https://www.cisco.com/c/en/us/td/docs/ios/ipmulti/configuration/guide/imd_mroute_cad.pdf, retrieved Jun. 13, 2018.

"HomePlug AV White Paper", Internet Citation, 2005, XP003018236, Retrieved from the Internet: URL:http://www.homeplug.org/products/whitepapers/HPAV-White-Paper_050818.pdf, retrieved Jan. 1, 2007.

Li Qi et al, "Adaptive Impedance Matching in Power Line Communication", 4th InternationalConference on Microwave and Millimeter Wave Technology, 2004, Tsinghua University, Beijing China.

Third-Party Preissuance Submission under 37 C.F.R. 1.290 and concise descriptions of the prior art, dated Mar. 4, 2015.

Gezielt fur Ideinere Application, p. 52 in journal "VPLT Magazine", No. 42 Jun. 2007, Editor in Chief: Florian von Hofen, published by Verbands fur Professionelle Licht und Tontechnik e.v.

Web page "Digital speaker System Bus (DSS Bus)", URL: http://www.varizone.net/VARIZONE/VAB-Line/DSS-Bus.html, 1 page, Apr. 26, 2010, retrieved from the Internet Archive Wayback Machine https://web.archive.org/web/20100426232528/http://www.varizone.net/VARIZONE/VAB-Line/DSS-Bus.html on Mar. 4, 2015.

Web page "Router and Control Engine (VAB1 Controller)", URL: http://www.varizone.net/VARIZONE/VAB-controller.html, 1 page, Apr. 26, 2010, retrieved from Internet Archive Wayback Machine, https://web.archive.org/web/20100426232549/http://www.varizone.net/VARIZONE/VAB-Line/VAB-Controller.html on Mar. 4, 2015.

Web page "Digital Multi Channel Amplifier Model (I.PAM)", URL: http://www.varizone.net/VARIZONE/VAB-Linell.PAM.html, 1 page Apr. 26, 2010, retrieved from Internet Archive wayback machine, https://web.archive.org/web/20100426232549/http://www.varizone.net/VARIZONE/VAB-Line/VAB-controller.html. on Mar. 4, 2015.

Brochure "VARIZONE Digital Public Address System VAB-Line", 12 pages, Feb. 2009, published by Qphonics AG, Ismanning, Germany.

McGrory, Dr. John, "Data Acquisition, Analysis and Energy Modeling", figure 6.34 on p. 80, text on drawing states that it relates to a project from Jan. 1997, published by Department of Electrical Services, Dublin Institute of Technology, Dublin.

Chemane et al. "Integrating modern instrumentation, control and information technology in the undergraduate laboratory", Instrumentation and Measurement Technology Conference, Mary 19-21, 1997, Ottawa, Canada, IMTC/07 Proceedings: Sensing, Processing Networking, IEEE vol. 2, IEEE 1997. Relevant section is p. 1429, Section III A. 2) Profibus PA and Figure 2.

Profibus-PA, Technical Information, party 4 Communications, L453EN, 44 pages, Dec. 1999, published by Samson AG, Frankfurt am Main, see e.g. Fig. 7 and 16 and related description, as well as pp. 6-7.

Rehg, James A. et al. "Fieldbus in the process control laboratory—it's time has come." Frontier in Education Conference, 1999. FIE'99. 29th Annual. vol. 3 IEEE, 1999, see Figure 4 Section named Fieldbus Control Architecture illustrating the term "Daisy Chain".

Ballo, David, "Network Anlayzer Basics", 1997, Hewlett-Packard Company Microwave Instruments Division, see slides #18 and #19, pp. 1-18 and 1-19, regarding the term "high impedance cable".

* cited by examiner

SYSTEMS, METHODS AND DEVICES FOR NETWORKING OVER HIGH IMPEDANCE CABLING

CROSS REFERENCE TO RELATED APPLICATIONS

This application is a continuation of U.S. application Ser. No. 16/983,713, filed Aug. 3, 2020, which is a continuation of U.S. application Ser. No. 16/548,493, filed Aug. 22, 2019, now U.S. Pat. No. 10,771,290, which is a continuation of U.S. application Ser. No. 14/349,546, filed Apr. 3, 2014, now U.S. Pat. No. 10,439,848, which is further the U.S. National Phase of International Application No. PCT/AU2012/001216, filed Oct. 5, 2012, and which further claims priority to U.S. Provisional Application No. 61/544,810, filed Oct. 7, 2011. The foregoing related applications, in their entirety, are incorporated herein by reference.

U.S. Pat. No. 7,747,725 and U.S. Patent Publication No. 2010/0235486 are also incorporated herein by reference in their entirety. In addition, Australian Provisional Application No. 2005902065, filed Apr. 22, 2005, and Australian Provisional Application No. 2005906272, filed Nov. 11, 2005, are each incorporated herein by reference in their entirety.

FIELD

The present disclosure is directed to networking and signal distribution over high impedance cabling.

BACKGROUND

High impedance cabling systems minimize power loss by increasing the voltage of signals for transmission over the cable and then reducing the voltage at the receiving end. This step-up/step-down process correspondingly reduces the current flowing through the cable and therefore the power loss in the cable. Such cabling is often installed into buildings for signal distribution over certain distances (for example, exceeding 50 feet). The maximum voltage used on the cable varies around the world according to regulations: in the USA, 70V is the maximum voltage that can be used without requiring conduit for the cable; in Europe, 100V maximum voltages are common. Cabling used for evacuation systems or installed in the plenum spaces of buildings is subject to a variety of regulations related to fire safety.

In conventional high impedance signal distribution systems such as 70/100V loudspeaker systems, the power is delivered to the speaker as an increased voltage version of the input signal. The power is delivered at an increased voltage minimizing losses in the cabling whilst signals are delivered via digital networking, avoiding many of the drawbacks present in existing systems whilst increasing the quality and flexibility of the signal distribution system.

A typical schematic of a high-impedance audio signal distribution system is shown in FIG. 1. A transformer 10 at the power-amplifier output steps up the voltage to approximately 70 volts at full power. The transformer 10 primary windings are coupled to a low impedance line 12, and the secondary windings are coupled to a high impedance speaker cable 14. Each speaker 16, 20, 24, 28 has an associated step-down transformer 18, 22, 26, 30 that matches the 70V high impedance line 14 to each speaker's impedance. The primary windings of the speaker transformers 18, 22, 26, 30 are connected in parallel to the transformer secondary windings in the power amplifier.

Power line communication or power line carrier (PLC) systems carry data on a conductor also used for electric power transmission. Electrical power is transmitted over high voltage transmission lines, distributed over medium voltage, and used inside buildings at lower voltages. Powerline communications can be applied at each stage. Most PLC technologies limit themselves to one set of wires (for example, premises wiring), but some can cross between two levels (for example, both the distribution network and premises wiring). Typically the transformer prevents the signal propagating beyond a single cable, which requires use of multiple technologies for larger networks.

The IEEE 1901 working group of the Institute of Electrical and Electronics Engineers develops standards for high-speed power line communications. This technology allows computer networks to send data over electrical power lines (contrasting with approaches such as power over Ethernet which send power over computer network wires).

HomePlug is the family name for various power line communications specifications that support networking over existing in-building electrical wiring. Several different, non-interoperable specifications exist under the HomePlug moniker, with each offering certain performance capabilities and variable compatibility with other HomePlug specifications. Some HomePlug specifications target broadband applications such as in-home distribution of low data rate IPTV, gaming, and Internet content, while others focus on low-power, low throughput, and extended operating temperatures for applications such as smart power meters and in-home communications between electric systems and appliances. HomePlug AV is reported to provide 20-30 Mbps in a typical home setting. IEEE 1901 claims to provide up to 500 Mbps, although this is a theoretical maximum speed.

Packet switched networking technologies are often used to transport media signals (e.g. audio, video, MIDI, or other signals). For example, the Audio Video Bridging (AVB) protocols may be used to transport media signals over an Ethernet network and the Real-Time Transport Protocol (RTP) standard developed by the IETF is widely used to transport multimedia signals over the Internet across many different types of link technology. A wide variety of digital and analogue media signals can be conditioned for transmission via a packet switched network.

Dante is a high performance, IP based media signal transport technology that employs a packet switched network. An exemplary Dante system is disclosed in U.S. Pat. No. 7,747,725 and U.S. Patent Application Publication No. 2010/0235486.

In addition to packet switched networks, simple networks can be constructed using point-to-point digital protocols such as AES3, S/PDIF, MADI, SDI, DVI, etc. A common scenario is a multi-drop cable carrying a common digital signal to many receivers. In many cases, these protocols are designed to operate over short distances with specific types of cables. Transmission over long distances or cable types not envisaged by the original protocol specifications may require signals to be conditioned appropriately for transmission over a high impedance cabling system. Signals are de-conditioned at the receivers and may additionally be boosted by devices connected to the cabling to further extend the distance served by the cabling.

There is a need for improved systems, devices and methods directed to networking and signal distribution over high impedance cabling. The present disclosure is directed to overcome and/or ameliorate at least one of the disadvantages of the prior art as will become apparent from the discussion herein.

SUMMARY

According to certain embodiments, a system for distributing digital data and electrical power to a plurality of devices over high-impedance cables is disclosed. The system is characterized by a gateway device connected to a power source; a first device connected to the gateway device by a cable, the cable being a high-impedance cable having at least two conductive paths, and wherein the first device receives electrical power and digital data from the gateway device via the cable over the same conductive path of the cable; a second device connected to the gateway device by the cable wherein the second device receives power and digital data from the gateway device via the cable over the same conductive path; and wherein the power source provides power to the first and second devices via the cable, and wherein the second device is connected to the gateway device through the first device via a daisy-chain topology.

According to certain embodiments, a gateway device configured to transmit digital data and electrical power to a plurality of devices over high-impedance cables is disclosed. The gateway device is characterized by a network port; a network interface connected to the network port, wherein the network interface is configured to receive and transmit digital data via the network port; a converter configured to receive digital data from the network interface and generate data packets suitable for transmission over a conductive path in a high-impedance cable; a coupler configured to receive the data packets and transmit said data packets over the conductive path; and a power supply unit configured to receive power from a power source and generate an output power suitable for transmission over the conductive path; wherein the gateway device is configured to transmit digital data and electrical power to a plurality of devices connected via a daisy-chain topology.

According to certain embodiments, a device configured to receive digital data and electrical power over a high-impedance cable is disclosed. According to certain embodiments, a device configured to receive and/or transmit digital data and electrical power over a high-impedance cable is disclosed. The device is characterized by a power supply adapted to be coupled to a conductive path in a high-impedance cable; a network interface adapted to be coupled to the conductive path in the high-impedance cable; and a processing system coupled to the network interface, the processing system configured to receive digital data from the network interface, convert the digital data to an analog or digital signal, and output the analog or digital signal to an amplifier, speaker, alarm, actuator, relay closer, serial port, lighting system, video projector or video monitor. In certain aspects, the device may also be configured to transmit and receive digital data over the high-impedance cable. In certain aspects, the device may also be configured to process and use certain data at the device. Processing may include de-compression of digital data, de-compression of audio/video signals, gain adjustment of audio signals, frequency equalization of audio signals, playout time alignment of audio and/or video signals, mixing of two or more audio signals, echo cancellation, triggering of pre-recorded audio/video playback, video scaling, video colour adjustment, de-interlacing, de-noising, adjustment of video frame rate, video picture-in-picture processing, other similar signal processing functions or combinations thereof. Further, processing may be modulated or controlled by a local processor in the device, or by signals or messages transmitted by a control processor elsewhere on the network, or by signals or messages transmitted from a control device such as a volume control or switch attached to the device or attached elsewhere to the network.

According to certain embodiments, a device configured to transmit digital data and receive electrical power over a high-impedance cable is disclosed. The device is characterized by a power supply adapted to be coupled to a conductive path in a high-impedance cable; a network interface adapted to be coupled to the conductive path in the high-impedance cable; and a processing system coupled to the network interface, the processing system configured to receive an input signal from a microphone, pre-amplifier, video camera, video playback device, audio playback device, midline inputs, security alarm, fire alarm, smoke detector, $CO_2$ detector, camera, potentiometer or volume control, serial port, swipe card reader, motion sensor, door position sensor or combinations thereof, convert the input signal into digital data, and output the digital data to a gateway device or other device via the network interface. For example, certain embodiments may be capable of device to device communication. In certain aspects, the device may also be configured to receive and transmit digital data over the high-impedance cable. In certain aspects, the device may also be configured to process and use certain data at the device. Processing may include compression of digital data, compression of audio/video signals, gain adjustment of audio signals, noise gating of audio signals, frequency equalization of audio signals, time alignment of audio and/or video signals, mixing of two or more audio signals, echo cancellation, triggering of audio/video capture, motion detection in video signals, video scaling, video colour adjustment, de-interlacing, de-noising, adjustment of video frame rate, video picture-in-picture processing, other similar signal processing functions or combinations thereof. Further, processing may be modulated or controlled by a local processor in the device, or by signals or messages transmitted by a control processor elsewhere on the network, or by signals or messages transmitted from a control device such as a volume control or switch attached to the device or attached elsewhere to the network.

Methods of distributing digital data and electrical power to a plurality of devices over high-impedance cables are also disclosed. Computer programming instructions adapted to cause a processing system to carry out these methods may be embodied within a non-transitory computer readable storage medium.

As well as the embodiments discussed in the summary, other embodiments are disclosed in the specification, drawings and claims. The summary is not meant to cover each and every embodiment, combination or variations contemplated with the present disclosure.

BRIEF DESCRIPTION OF THE FIGURES

These and other features, aspects, and advantages of the present invention will become better understood with regard to the following description, appended claims, and accompanying figures where

DESCRIPTION

The present disclosure will now be described in detail with reference to one or more embodiments, examples of which are illustrated in the accompanying drawings. The examples and embodiments are provided by way of explanation and are not to be taken as limiting to the scope of the disclosure. Furthermore, features illustrated or described as part of one embodiment may be used by themselves to provide other embodiments and features illustrated or described as part of one embodiment may be used with one or more other embodiments to provide a further embodiments. It will be understood that the present disclosure will cover these variations and embodiments as well as other variations and/or modifications.

It will be understood that the term "comprise" and any of its derivatives (e.g., comprises, comprising) as used in this specification is to be taken to be inclusive of features to which it refers, and is not meant to exclude the presence of any additional features unless otherwise stated or implied.

The features disclosed in this specification (including accompanying claims, abstract, and drawings) may be replaced by alternative features serving the same, equivalent or similar purpose, unless expressly stated otherwise. Thus, unless expressly stated otherwise, each feature disclosed is one example of a generic series of equivalent or similar features.

Certain embodiments are directed to ensuring that the power distribution methods used do not significantly affect the quality of data and/or signal distribution. Certain embodiments are directed to ensuring that the power distribution methods used do not substantially affect the quality of data and/or signal distribution. Certain embodiments are directed to decoupling power and signal distribution. Power distribution can be AC or DC using various combinations of voltages or frequencies that are useful since the transmission methods used for data or media signals are not significantly affected, or substantially affected, by the choice of power distribution mechanism. For a given power level, the voltage can be increased and current is correspondingly decreased, minimizing resistive losses in the cabling and supporting efficient power distribution over high impedance cabling systems.

Data or signal distribution is via a digital networking protocol carried over the same cable used to distribute AC or DC power. For example, the digital network interfacing can be packet switched such as HomePlug/IEEE 1901 powerline networking or Canbus; or can be a non-packetized protocol like SDI, AES3 or S/PDIF. Other digital networking protocols are also contemplated. Also it is possible in certain embodiments to use combinations of networking protocols. It may be necessary to condition the signals for transmission over high impedance cabling which is also providing power to devices.

Figure 1:
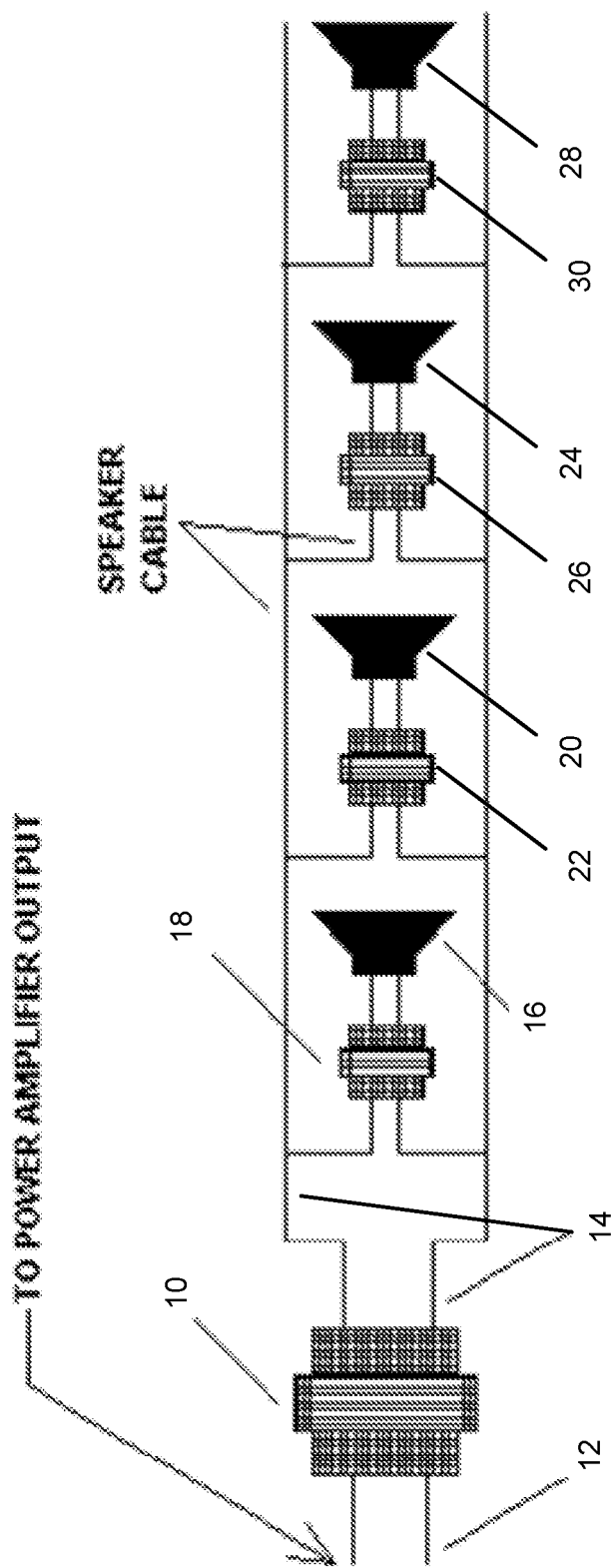
FIG. 1 shows an a typical schematic of a high-impedance audio signal distribution system using a step-up transformer on the amplifier output.
Figure 2:
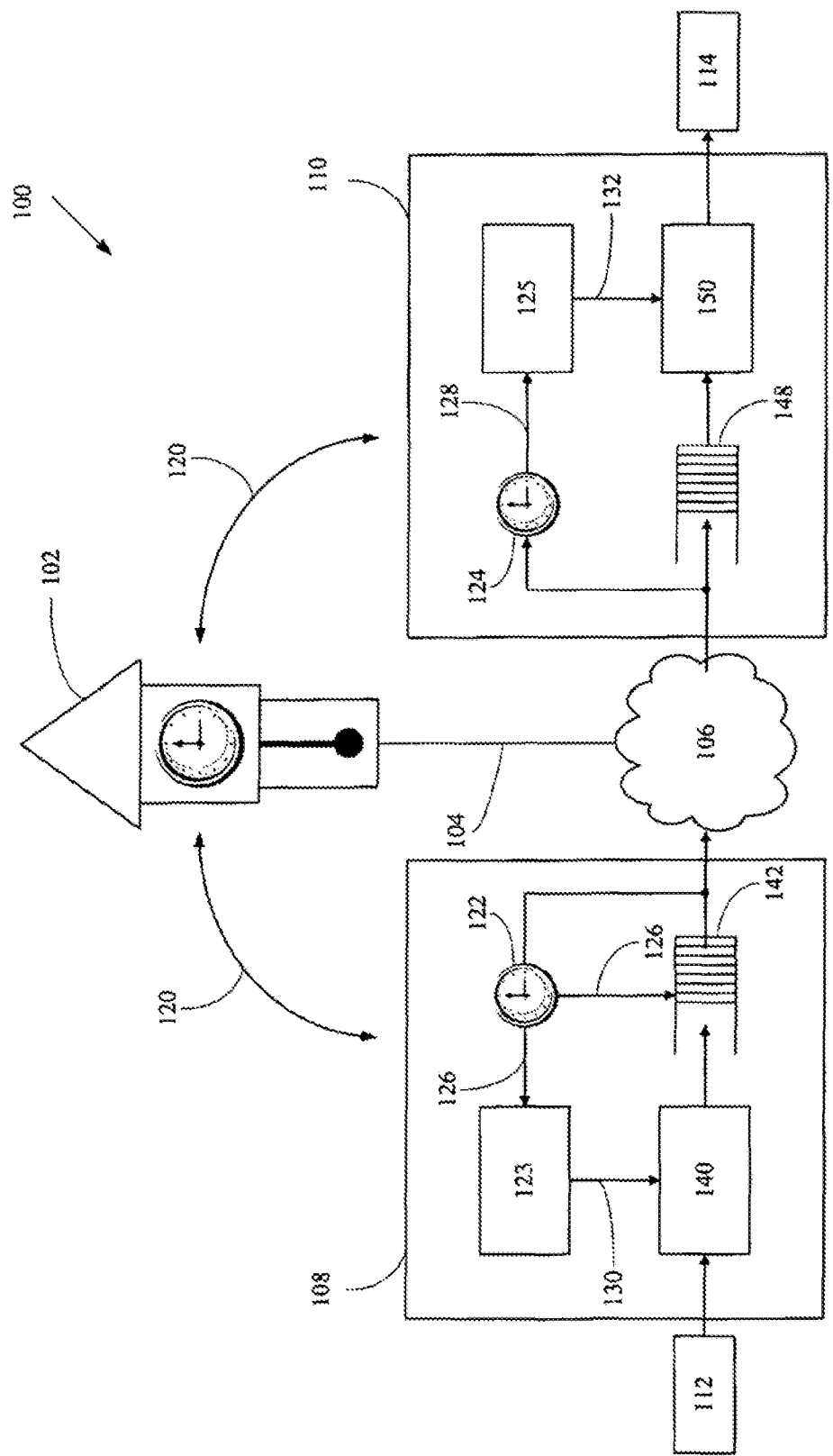
FIG. 2 illustrates an exemplary schematic diagram of a digital network in accordance with certain embodiments.
Figure 3:
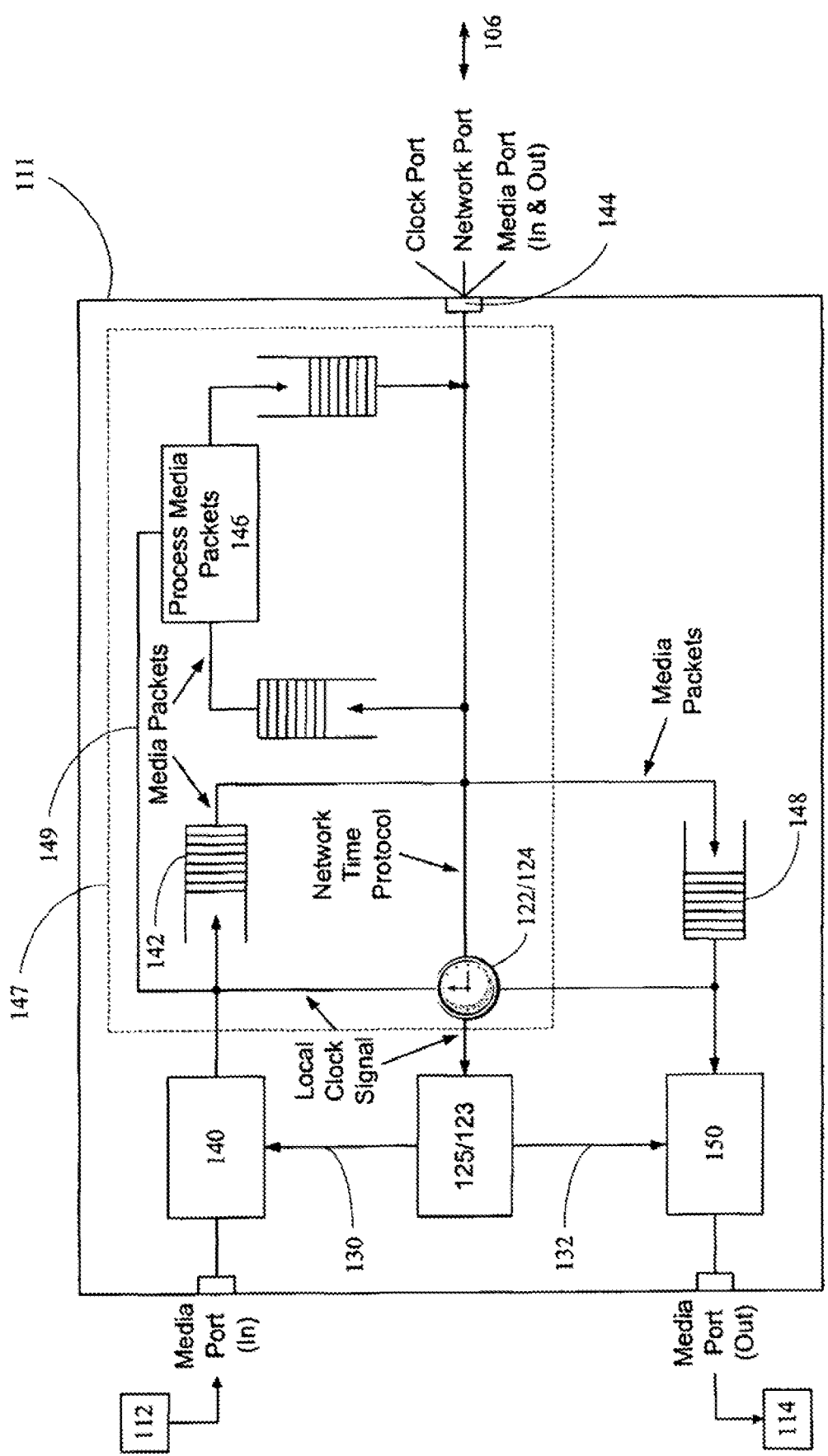
FIG. 3 is an exemplary block diagram of a network device that is able to receive, send and process media packets in accordance with certain embodiments.

An exemplary digital network similar to that described in U.S. Pat. No. 7,747,725 is illustrated in FIGS. 2 and 3. In these figures, a data network 100 comprises a master clock device 102 to generate a system time signal 104 for the network 100. Two network devices 108 and 110 are connected to each other by a network 106 so that they are able to send and receive media packets. In certain embodiments of the present disclosure, the network 106 is comprised of high impedance cabling as described in more detail below. The network devices 108 and 110 are also connected to media devices 112 and 114 respectively which are able to generate and/or playout media signals. The network device 108 is able to receive and packetize media signals to be sent as media packets over the network 106. The network device 110 is able to receive packets and transmit media signals contained in the media packets to the media device 114. Network devices 108 and 110 each contain a local clock 122 and 124 and a media clock 123 and 125 respectively.

The network includes a network time protocol (NTP) 120. A NTP 120 is a set of network messages used to synchronise a clock of one device with a clock of another device. In this case, the local clocks 122 and 124 are synchronised with the master clock 102 using the NTP 120 and the system time signal 104. The network messages sent by the NTP 120 includes the sending of packets on the network 106 that relate to the system time. There are various known standard NTPs, for example, the IEEE 1588 Precision Time Protocol, and the IETF NTP.

Media clock signals 130 and 132 are derived (i.e. synthesized) from the local clock signals (i.e. Local TOD signal) 126 and 128 respectively. The NTP uses a bi-directional exchange of messages to enable the calculation of both clock offset and rate.

Clock rate synchronisation ensures that the rate at which the network devices 108 and 110 send and/or receive data packets is the same to within a desired accuracy. Clock offset synchronisation ensures that the time difference from the master clock 102 to the local clocks 122 and 124 is the same to within a desired accuracy. In this way any two clocks in the network have a bounded rate and offset error. Rate synchronisation also ensures that the media signal is produced and consumed by the network devices at a rate that is derived from the rate of the master clock. The derived rate of the network device may be different from the rate derived by another network device on the network. The derived rate (local clock frequency) may be related to the sample rate of the media signals that the network device is converting into packets (i.e. 256 for 48 Hz or 256 for 44.1 Hz). Rate and offset synchronisation enables the local clocks 122 and 124 to compensate for variable delays (i.e. days in the reception of media packets) and achieve tighter synchronisation regardless of the location of the network device 108 and 110 in the network 100 topology.

The synchronized local clock 122 is used to timestamp media packets with the earliest system time (that is also the local time 126) at which the media signal contained in the packet was converted into digital form by the data converter 140. Using the timestamp, the network device 110 that receives the media packet can coordinate the correct playout time for the media signals.

With reference to FIG. 2, operation of an exemplary sending network device 108 will now be described. Incoming analogue media signals produced by the media player 112 reach the analogue to digital converter 140 of the network device 108. The rate that the analogue to digital converter 140 converts the media signal is governed by the media clock 130. The digital signal produced by the analogue to digital converter 140 is passed to a data packetise and timestamp buffer 142 for collection into media packets. The media packets are timestamped with the earliest system time at which the media signal contained in the packet was converted into digital form.

The local clock 122 supplies rate control, and offset control to the packetising and time stamping of the media packets via link 130. Since the local clock 122 is synchronised with the master clock 102, the rate that the media packets are produced is at the same rate as the system time signal 104 of the master clock 102. This will also be the same rate of the local clock 124 of the receiving network device 110 so the rate that the entire network 100 produces and consumes media packets is synchronised. The local clock 122 is also synchronised to the master clock 102 for offset. The adjustment of the local time to synchronise with the time of the master clock 102 is achieved using an offset amount. The local time offset from some epoch (e.g. seconds since 00:00:00 Jan. 1, 1970) tracks the master clock time. The packets are then passed to the network port 144 for transmission on the network 106 for delivery to the network device 110.

Operation of an exemplary receiving network device 110 will now be described. Incoming packets are received from the network 106 in a jitter compensation data buffer 148 where they are delayed to account for the maximum expected latency variation (or jitter) between the sender 108 and the receiver 110. The receiver 110 uses the time stamps of the received packets to reorder the packets if necessary. The receiver 110 may align and combine media signals received from different sources. Further, the device 110 also determines the playout time for the media signals. The media signals are then passed to the digital to analogue converter 150 for conversion to analogue at a rate controlled by the media clock signal 132 of the media clock 125. The media signal is then sent to a media device 114, for instance, for playout.

The exemplary device 111 shown in FIG. 3 is able to perform the functions of both network devices 108 and 110. Further, this network device 111 can be used for processing media signals in a digital form. In this case media packets are received from one or more senders at the network port 144 and processed within the network device 111 at processor 146. The timestamps of the received media packets are used to align the digital media signals of the packets in time, if necessary. Processing takes place to produce a new set of digital media signals (e.g. mixing a set of audio channels to a left/right stereo channel pair). This processing takes place at the rate and offset controlled by the local clock 122/124 via link 149. The new digital media signals are placed into packets and transmitted at a rate determined by the local clock signal 149 and with timestamps that are determined by the local clock offset. The processed packets are then retransmitted from the network port 144. Rather than generating a new timestamp for outgoing packets from the local clock 122 and 124, it is also possible to copy a timestamp (i.e. the offset) from an incoming packet to the outgoing packet, thus preserving the time that the media signal was originally generated. In this way, media signals can be processed purely in a computer domain by the components enclosed by 147 which may be part of a personal computer.

Any clock left to itself will tick along at a certain rate which will be slightly different for each piece of hardware. The process of disciplining a clock adjusts the rate and offset of the clock to track another reference clock (in this case the master clock 102). The process of clock synchronisation and synthesis will now be described in more detail.

The local clock signal 126 is a local representation of time at the network device 108. The local clock 122 and 124 is synchronised to the data network master clock 102 using the NTP 120. The local clock signals 126 and 128 are generated by a local oscillator. Even if each of the local oscillators have the same nominal frequency (e.g. 12.288 MHz), their actual frequency (or rate) may be slightly different. In addition this rate may drift with time due to effects such as ambient temperature variations. A local clock 122 and 124 is considered synchronized to the master clock 102 if its rate is actually the same as the master clock 102 to within a desired accuracy.

The local clock signal 126 and 128 may be an electrical signal (e.g. produced by a Voltage Control Oscillator (VCO)) or it may be represented as software counters maintained by an operating system date/time facility. In all cases, the local clock signal 126 and 128 is governed (i.e. disciplined) so that it advances (ticks) at the same rate as the master clock 102.

The local clock signal 126 drives a time of day (TOD) clock which can be expressed as a number of seconds since an epoch. For example, Network Time Protocol version 3 (NTPv3), expresses time as two 32 bit numbers corresponding to the number of seconds and fraction of a second elapsed since 00:00:00 Jan. 1, 1900. The TOD clock is used to timestamp media packets. The epoch for this TOD clock is a global constant for the network. The availability of a global timestamp enables media signals originating from different sources to be time-aligned and combined accurately by the receiving network device 110, for example, for playout. A local clock 122 and 124 is considered to be offset synchronized to the master clock 102 if its time difference from the master clock 102 is the same to within a desired accuracy. If the time difference between master clock 102 and any local clock 122 and 124 is less than a ¼ of the sample period (5 µs for a 48 kHz signal) then any two local clocks 122 and 124 are synchronised to each other to within ½ of the sample period. This enables samples generated simultaneously at two different sources 112 to be accurately aligned for playout.

When the local clock signal 126 is an electrical signal (e.g. from a VCO), clock pulses increment a counter value which represents absolute time. The counter can be read to produce a timestamp which can be compared with timestamps from the master clock 102 (via the network time protocol 120) in a phase locked loop to achieve absolute time (offset) synchronisation in addition to rate synchronisation.

Accurate clock offset synchronization benefits from a network time synchronization protocol with a two way exchange of messages. This enables the local clock 122 and 124 to calculate the network delay between it and the master clock 102 and compensate for it. Exemplary standard network time protocols 120 that may be suitable are the Network Time Protocol (NTP), and the IEEE 1588 Precision Time Protocol. NTP Version 3 is widely implemented and has been documented by the Internet Engineering Task Force (IETF) in RFC1305 as an internet draft standard. Additional NTP information can be found at http://www.ntp.org/. IEEE 1588 is a published standard of the IEEE (Std 1588-2002) and is available from http://standards.ieee.org/. Additional IEEE 1588 information can be found at http://ieee1588.nist.gov/.

IETF NTP 120 is used on general purpose computer systems and can readily achieve millisecond time synchronization accuracy in a local area network. IETF NTP 120 is slave driven in the sense that a request from the slave (i.e. here the network device 108 or 110) results in a two way message exchange, which enables the slave to calculate both its time offset from the master clock 102 and the network delay.

Herein, IEEE 1588 is the preferred time synchronisation protocol 120, although many NTPs may also be used. In general, timestamping packets as close to the network transmission or reception time as possible reduces the error due to end-system jitter. Timestamping can be performed (in preference order) in hardware, in a device driver or in an application.

IEEE 1588 was designed for use with industrial control and measurement systems and is suited to accurate hardware implementation. Hardware implementations have been shown to achieve sub-microsecond time synchronization accuracy. Implementation of IEEE 1588 Border Clocks in switches eliminates the jittering of clock packets as they pass through them. IEEE 1588 uses frequent multicast messages from the master to calculate the offset. It uses a less frequent delay request message from the slave, resulting in a delay response message from the master to calculate the delay.

It may also support redundant master clocks by including a mechanism where another master clock takes over if the original master clock 102 fails. Certain embodiments of the present disclosure can use the combination of two separate IEEE 1588 networks each having their own master clock, for example, a recording studio in Sydney, Australia and a recording studio in Melbourne, Australia. These two networks may coordinate their master clocks via another mechanism, for example GPS time synchronisation. This allows the two networks to share a common notion of time and send timestamped packets between each other.

The system may also be implemented using a set of network devices which synchronize with one master, while another set of devices synchronize with a different master on the same network, either at different times or simultaneously. As an example, a set-top box synchronized to an external video source may act as a master clock when viewing a video, whereas the amplifier in an audio system may act as the master clock for music.

The network time protocol 120 exchanges messages at a regular rate (e.g. every 1 second). By making this interval a non-multiple of media sample rates (i.e. 48 kHz or 44.1 kHz) the possibility of the clock packets being encountered and being jittered by a media packet in transmission on the network 106 is minimised.

The NTP IEEE 1588 is discussed further next. In the IEEE 1588 protocol, the best master clock 102 and a backup master clock (not shown) are elected from a set of potential candidates. The elected master clock 102 may be a local clock 122 of a network device 108. The backup master clock uses the IEEE 1588 network time protocol 120 to synchronise its clock with the elected master 102. In the case that the master fails 102, the backup master takes over and other local clocks that were previously synchronised with the elected master clock 102 will now synchronise with the backup master clock and the network 100 continues to operate smoothly.

Clock synthesis is a widely studied problem and various techniques can be applied to synthesise a media clock 123 and 125 from the local clock signal, including Direct Digital Synthesis (DDS), Digitally Controlled Oscillators (DCO) or Voltage Controlled Oscillators (VCO) controlled by a Digital to Analogue Converter (DAC).

A digital media signal has an implied clock. For an audio media signal, this can be the audio sample rate (e.g. 48 kHz). For a video media signal, this can be the number of frames per second. Hardware that produces or consumes digital media signals often uses a multiple of the sample rate or frame rate. For example, analogue-to-digital converters 140 commonly need a clock that is 128× or 256× the rate at which audio samples are actually produced. We term this clock multiple the media clock 123 and 125. Media clock synthesis is the process of deriving media clock signals 130 and 132, which is a digital to analog converter (DAC) word clock, from the network time protocol 120.

At least three techniques can be used to derive a media clock: (i) directly disciplining a hardware clock from the network time protocol; (ii) controlling a pulse width modulated media clock 123 and 125 with a master clock 102 that has been disciplined by NTP/1588; and (iii) controlling a software timer from a master clock 102.

Figure 4:
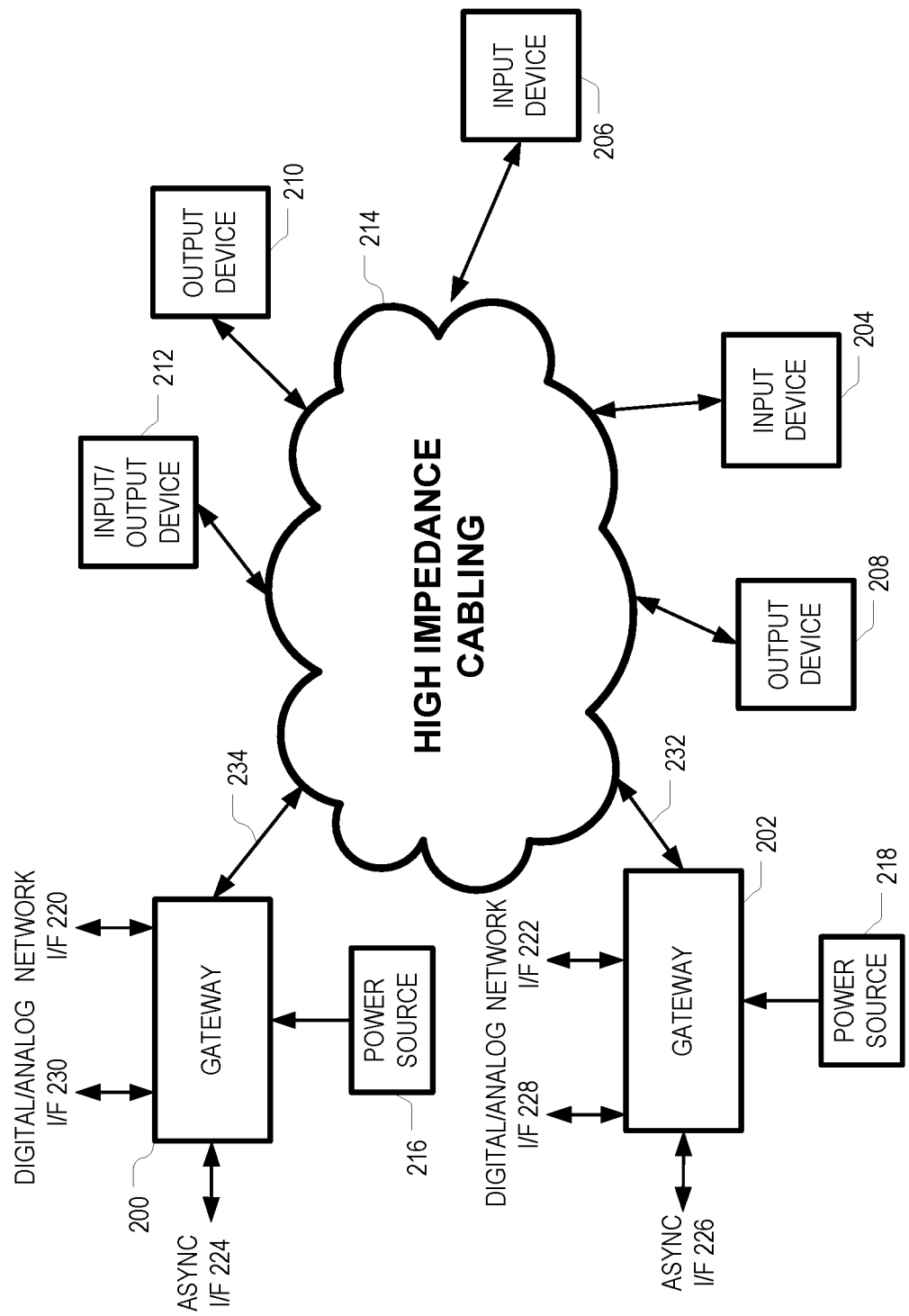
FIG. 4 illustrates an exemplary system schematic architecture in accordance with certain embodiments.

FIG. 4 shows the high level components of a system in a schematic format. Gateway devices 200, 202 provide power to the input devices 204, 206, the output devices 208, 210, and the input/output device 212 (e.g., network devices 108, 110 and 111 described with reference to FIGS. 2 and 3 above) via the high impedance cabling 214. In certain embodiments, power is provided to the gateway devices 200, 202 by power sources 216, 218. The power sources 216, 218 may be, for example, mains power supply, batteries, a generator or combinations thereof. In certain embodiments, one or more non-gateway devices may provide power to devices and/or gateways connected to the high impedance network, power being sourced from mains supply, batteries, generators, other sources or combinations thereof. Power sources other than gateways may increase the power redundancy options for safety critical systems. A gateway device 200, 202 also receives and conditions, if needed, digital and/or analogue signals for transmission and/or reception over the networking interface 232, 234 used on the high impedance cable network 214. Data and signals may be transferred to/from devices not connected to the high impedance cabling via the asynchronous signal interfaces 224, 226, digital/analogue signal interfaces 228, 230, the network interfaces 220, 222 in the gateway devices 200, 202 or combinations thereof. Data and signals may also be transferred directly from one device to another device without passing through the gateway.

The input and/or output devices may be powered via the high impedance cabling 214. In certain embodiments, power, or a portion of the power, may be provided from other sources such as mains power supply, batteries, a generator or combinations thereof. An input or output device may convert signals transported over the high impedance cabling to/from an analogue or digital interface in the device (e.g. a connector) for connection to another external device, or may act as a transducer converting the signal into another form (e.g. sound, light). For example, an input or output device may contain one or more microphones, speakers, displays, cameras, motion sensors, switches, lights or other kinds of I/O devices. An input or output device may in certain embodiments be a combination of devices as well.

A high impedance power or signal distribution network transfers electrical power with a high voltage relative to current, minimizing impedance losses in cable or other components in the system. High impedance design is particularly important for power distribution. Efficient power transfer through long cable lengths and/or conductors with small cross sectional area is commonly achieved by increasing the operating voltage and reducing the operating current for a given power level. High impedance distribution systems can use a variety of voltages and current configurations; however power losses due to cabling impedance are typically no more than 20%. Many high impedance systems have impedance losses under 10%. A variety of cable types may be used to construct a high impedance network, including but not limited to: figure-8 cable, twisted-pair cable and coaxial cable. Other types of cables are also contemplated. In certain applications it is desirable to support operation over cabling already deployed. For example, it may be desirable to support operation over the high impedance speaker cabling already deployed in constant voltage speaker systems and/or the coaxial cabling often used for video distribution. Building cabling may be required to comply with safety standards when it is installed into plenum spaces or when it is part of a safety critical system, such as an evacuation alarm system. It can be therefore desirable to support operation over fire and/or plenum rated cabling. Certain embodiments disclosed herein may also operate on low impedance cabling (e.g., short cables, cables with large cross-sectional areas or arrangements where power losses due to cable impedance are low), or on cabling which incorporates low impedance segments. For example, it may be beneficial to operate on low impedance cables already present in a facility. In certain embodiments, high impedance cabling may be more cost effective.

FIGS. 5a to 5f show six different exemplary topologies using cabling with two conductors. Devices (D1, D2, . . . ) attach to both of the two conductors. Optional termination (Z1, Z2 . . . ) can be used in the system.

Figure 5B:
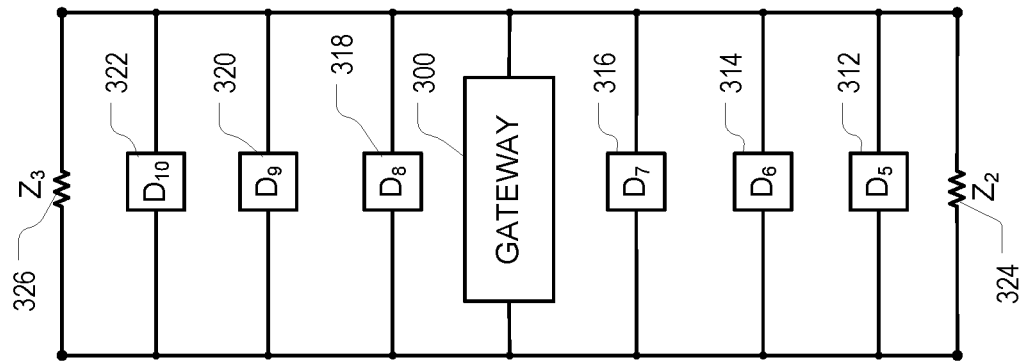
FIGS. 5a to 5f illustrate exemplary cabling schematic topologies in accordance with certain embodiments.
Figure 5A:
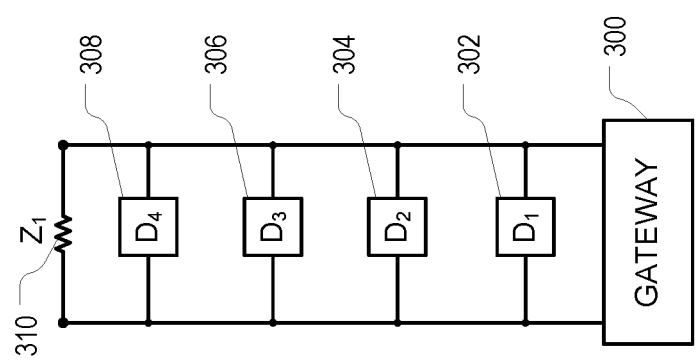
Figure 5D:
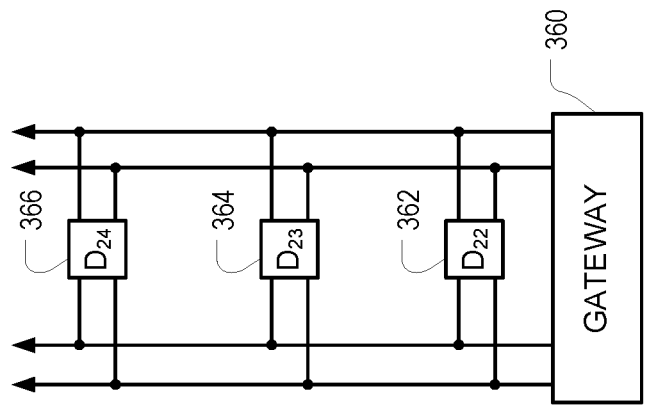
Figure 5C:
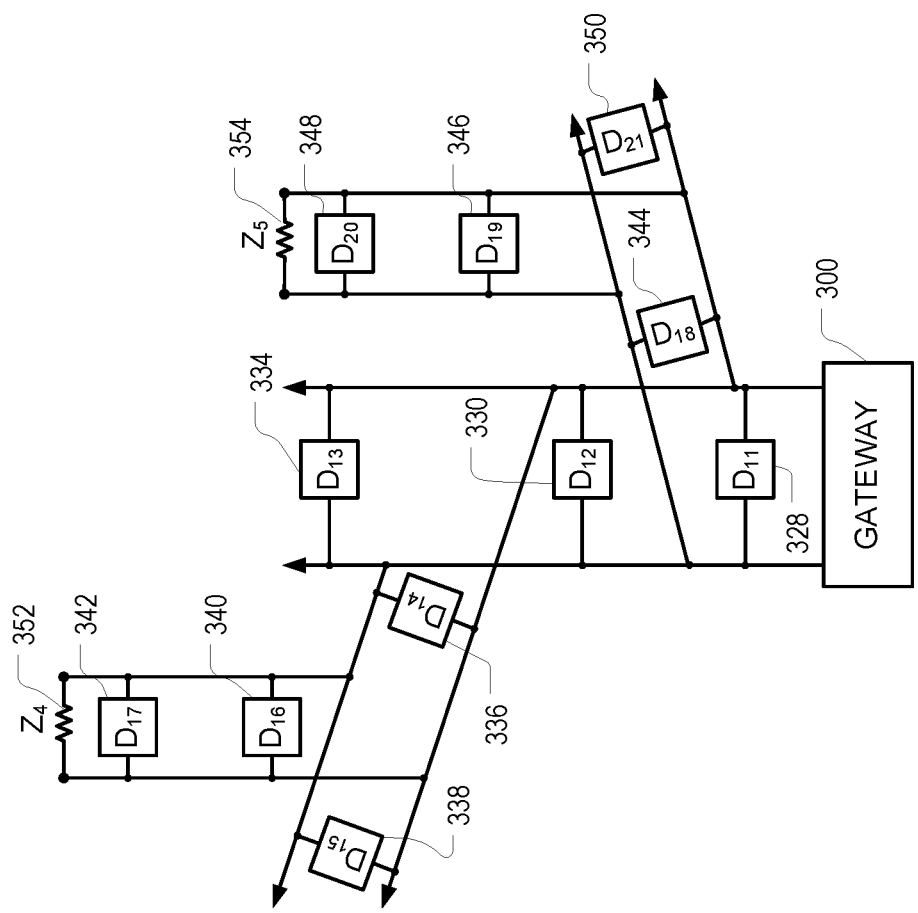

FIGS. 5a and 5b show exemplary daisy chain topologies. The gateway 300 in FIG. 5a is at one end of the daisy chain and in FIG. 5b the gateway 300 is in the middle of the chain. FIG. 5a includes four network devices 302, 304, 306, and 308 and a termination component 310. FIG. 5b includes six network devices 312, 314, 316, 318, 320, 322 and two termination components 324, 326. These daisy chain topologies are advantageous for controlling the impedance of the system, minimizing signal reflections and maximizing performance of the digital networking system. FIG. 5c shows a branching tree-like topology as is often used in constant voltage loudspeaker systems. FIG. 5c includes a gateway 300, eleven network devices 328, 330, 334, 336, 338, 340, 342, 344, 346, 348, 350, and two termination components 352, 354.

Other topologies are also contemplated. For example, FIG. 5d illustrates an exemplary system schematic architecture using dual redundant connections. The redundant connections may use the mechanism described in PCT/AU2007/000667 and/or continuations thereof to provide completely redundant paths for media signals. The dual connections could provide only power redundancy, only network redundancy, or both network and power redundancy. This redundant system includes a gateway 360 configured to provide redundancy and three network devices 362, 364, 366.

Figure 5F:
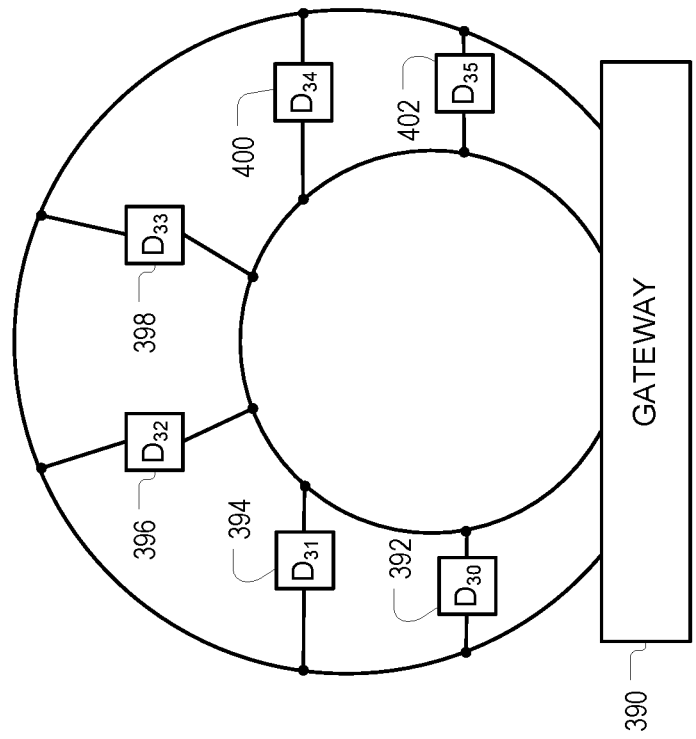
Figure 5E:
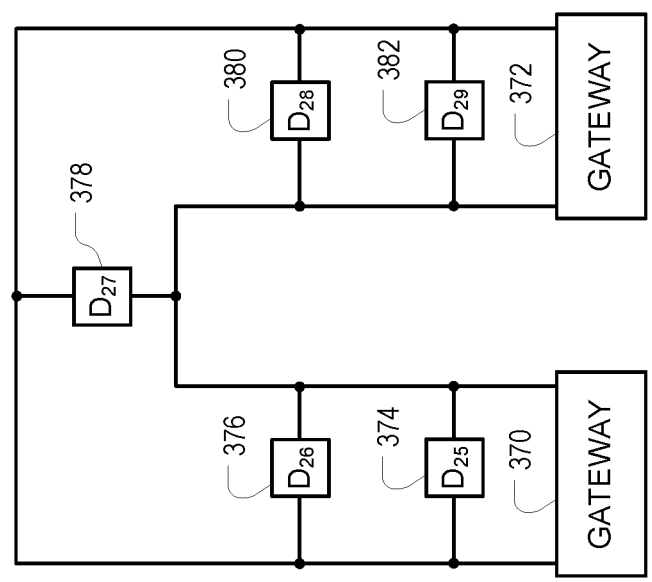

FIG. 5e illustrates an exemplary system schematic architecture showing a single chain of five network devices 374, 376, 378, 380, 382 attached to two gateways 370, 372. A single break in the cabling will break the chain into two distinct segments. If each gateway 370, 372 provides both power and networking, operation can continue with a single break in the ring. Additionally, the ring topology provides protection against failure of one of the gateways.

FIG. 5f illustrates an exemplary system schematic architecture showing a single chain of six network devices 392, 394, 396, 398, 400, 402 looped back to a single gateway device 390. A single break in the cabling will break the chain into two distinct segments. If power and networking can be supplied through both of the connections to the gateway, operation can continue in the presence of a single break in the ring.

Optimal or substantially optimal termination occurs when the impedance of the terminator or terminating device matches or substantially matches that of the cable, ensuring that no or substantially no reflections occur. In practice, optimal termination rarely occurs, however termination impedances that are substantially similar to the cable impedance may reduce noise and increase the performance of the system. In certain embodiments, automatic sensing of impedance mismatch and/or automatic impedance matching may be employed. The gateway devices (370, 372, 390) in FIG. 5e and FIG. 5f may in certain embodiments provide automatic termination, substantially matching the impedance of the attached network of cables and devices. The gateway device (300) in FIG. 5b may sense that the cables are appropriately terminated and employ a high impedance attachment to the network to avoid impairing the termination already present. In general, gateway devices may measure the impedance of the attached network of cables and devices, reporting on impedance mismatches and/or dynamically adjusting impedance to compensate for mismatches.

Network devices may terminate the cabling with a fixed value appropriate for the attached network, by sensing impedance mismatch and selecting appropriate termination impedance, or by dynamically adjusting termination impedance. Additionally, network devices may detect and report termination mismatches without taking further action. Network devices not located at the end of a cable or sensing that the cable is already appropriately terminated may operate with a high impedance attachment to the network cable to avoid impairing the termination already present.

The wiring may consist of segments of cable joined together at devices, long continuous cables with devices attached to the cable without breaking the cable into multiple segments, one or more cable segments terminating at or originating from a device or gateway, cable segments terminating into connectors, terminals or conductors that then facilitate attachment to other cable segments, or combinations thereof.

One issue with power distribution is to minimize the power losses in the cabling. At a given power, loss in the cable may be minimized by minimizing the current in the cable and therefore increasing the voltage at which the cable operates. On the other hand, in certain embodiments, it is desirable to keep the operating voltage on the cable below various regulatory minima to avoid conduit, specialized installation skills, ultimately increased costs or combinations thereof. Voltages typically used for constant voltage systems include: 12V, 24V, 25V, 50V, 70V, 70.7V, or 100V, rarely even 200V. Voltages in between these discrete values can also be used.

If the power distribution is via Alternating Current (AC), the gateway and devices may couple power to/from the high impedance cabling via transformers, or alternatively via power electronics. If transformer coupling is chosen, it may be advantageous to increase the power supply frequency to minimize the size of the transformers. Whilst increasing the frequency reduces the size and cost of the transformer, hysteresis losses increase linearly with frequency. In constant voltage audio systems, 30-40% loss in the coupling transformer is commonly experienced, so for systems where efficiency is a factor low power supply frequencies are desirable. Saturation of the magnetic materials in the transformer limits how far power supply frequency may be reduced. Common power supply frequencies commonly range from 50-400 Hz, where 50 Hz and 60 Hz are commonly used by electric utility companies and 400 Hz is used in aircraft. Historically, AC power systems have used frequencies anywhere in the range of 16-140 Hz depending on the application. The use of AC power electronics in a power distribution system may avoid many of limitations of systems based on transformers. If AC power is simultaneously supplied to the same cable by more than one gateway device, the phase of the power typically will need to be coordinated.

If power distribution is via Direct Current (DC), the gateway and devices couple power to/from the high impedance cabling via electronic circuitry such as DC-DC converters, voltage regulators and the like. With DC power, arranging for more than one gateway device to supply power to the cable may be simplified since there is no AC phase to be aligned. Even when DC power is used, some embodiments may time packet transmissions so as to avoid cyclic noise induced into the cabling by AC power distribution.

Protection against device short circuit may be achieved by use of a fuse or circuit breaker. Other ways of protecting against a short circuit may also be used.

Whether AC or DC power distribution is chosen, the decoupling of signal distribution and power distribution enables increased power distribution efficiency since power distribution and signal distribution can be separately optimized. Since signal distribution is via a digital network, AC or DC power distribution may use small cost effective transformers, efficient transformers, power electronics, or even relatively noisy power electronics without affecting signal quality. In contrast, transformer selection in a constant voltage audio system directly affects the quality of the audio, since audio is distributed as a high power baseband analogue signal and is directly affected by transformer distortion, frequency losses or noise.

The digital network interfacing can be packet switched such as HomePlug/IEEE 1901 powerline networking or Canbus; or can be a non-packetized protocol like the SMPTE Serial Digital Interface (SDI) family of video interfaces, AES3/IEC 60958 or similar standards or AES10 the Multichannel Audio Digital Interface (MADI) standard. In certain embodiments, other packet switching technologies and combinations of packet switches may also be used. It may be necessary to condition the signals for transmission over high impedance cabling which is also providing power to devices.

Figure 6:
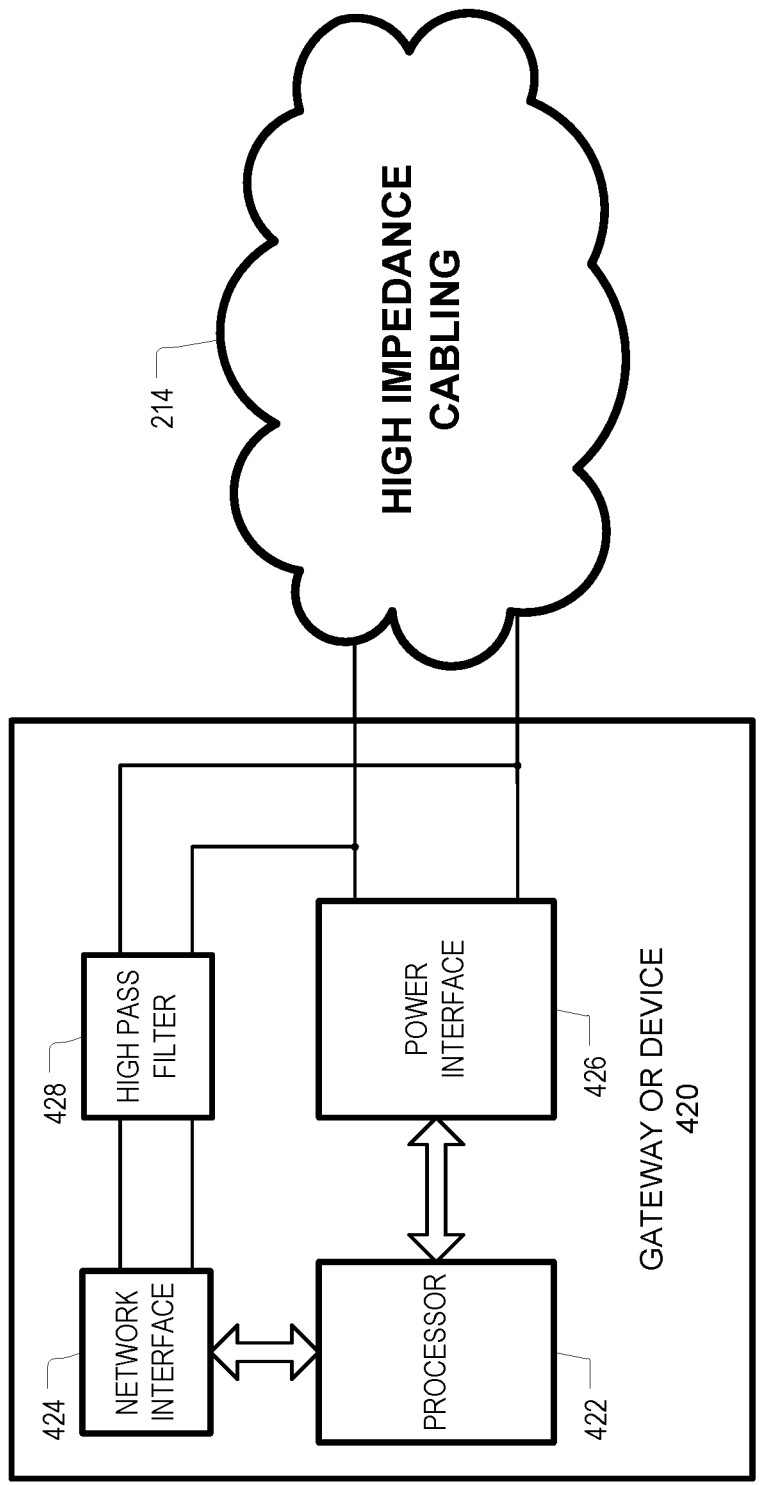
FIG. 6 illustrates an exemplary schematic of a digital network coupled to a device with high pass filtering in accordance with certain embodiments.

The digital network interfacing operates at relatively high frequencies when compared with the power interfacing, allowing the network interface to be coupled by use of a high pass filter as shown, for example, in FIG. 6. FIG. 6 illustrates an exemplary gateway or device 420 attached to a high impedance cabling 214. The gateway or device 420 includes a processor 422 configured to perform a number of functions. For example, the processor 422 controls a network interface 424 and a power interface 426 such that data can be transmitted and received on the high impedance cabling 214. The processor 422 may have other functions such as encoding or decoding media data, rendering media data to an output, etc. The high pass filter 428 is connected between the output of the network interface 424 and the output of the power interface 426 to couple data from the processor 422 onto the high impedance cabling 214. Other filtering devices may also be used.

Figure 7:
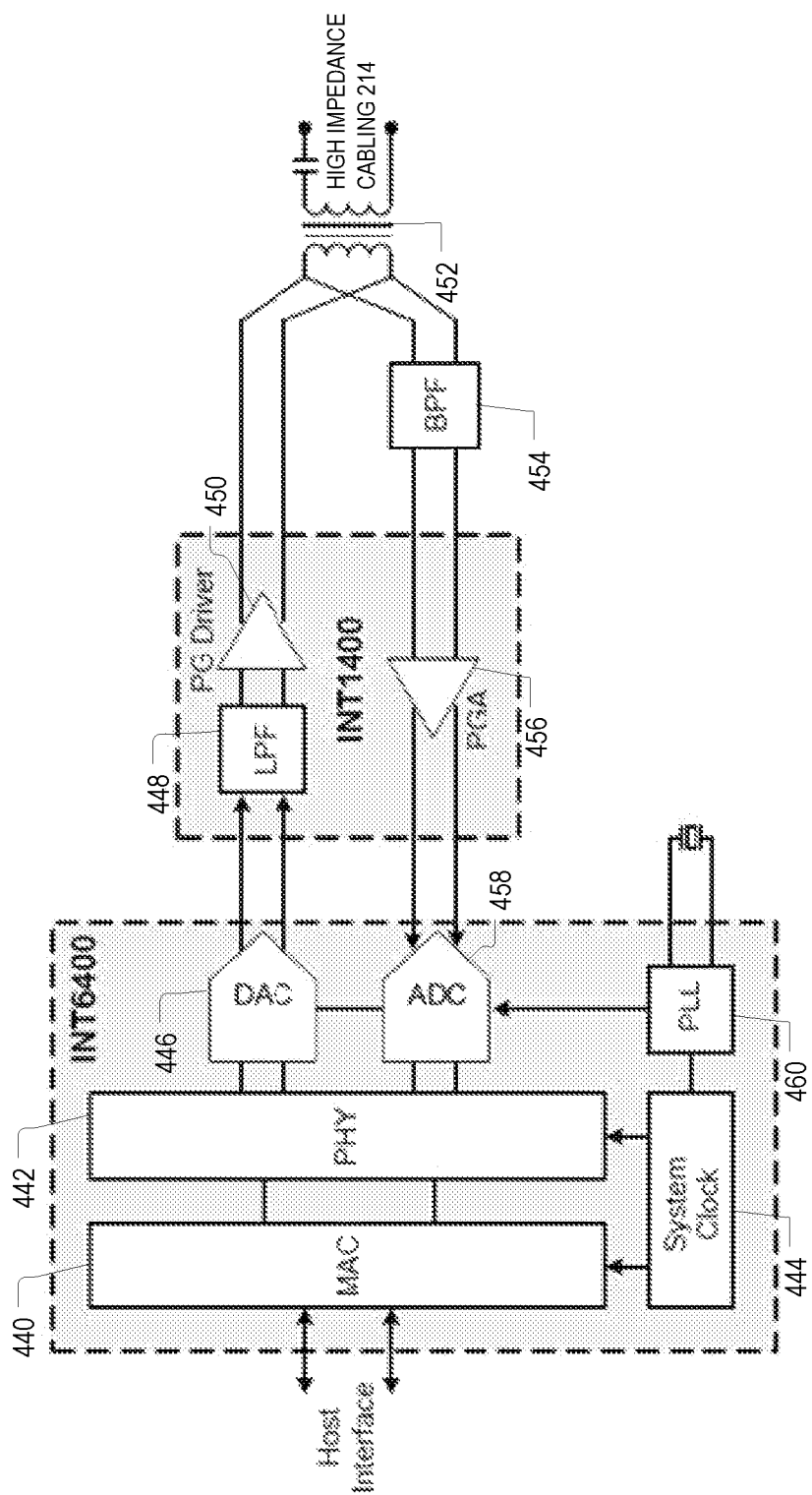
FIG. 7 illustrates an exemplary network interface schematic in accordance with certain embodiments.

FIG. 7 shows an exemplary block diagram of a HomePlug AV network interface chip set. In certain embodiments, the "Powerline" interface connects to the high impedance cabling network 214. The schematic shows a host interface coupled to a medium access control (MAC) component 440, which is in turn coupled to the physical layer (PHY) component 442. Both components are driven by a system clock 444. The MAC component 440 and PHY layer may be implemented in, for example, firmware or software running on an embedded microprocessor as would be known to the skilled artisan. Output from the PHY component 442 passes through a digital to analog converter (DAC) 446, low-pass filter 448, and then is coupled via driver 450 onto windings of a transformer 452, which couples the data onto the high impedance cabling 214. Data from the high impedance cabling 214 follows a reverse path, coming through transformer 452 through a bandpass filter 454, programmable gain amplifier 456, and then through an analog to digital converter (ADC) 458 to the PHY layer component 442. The ADC timing is governed by a phase locked loop 460. In this case, signals are transmitted over the digital network operating on the high impedance cabling in a packetized format using the HomePlug/IEEE1901 PHY. Ethernet and/or IP packets transferred through the "Host Interface" are received/transmitted using the "Powerline" interface.

Figure 8:
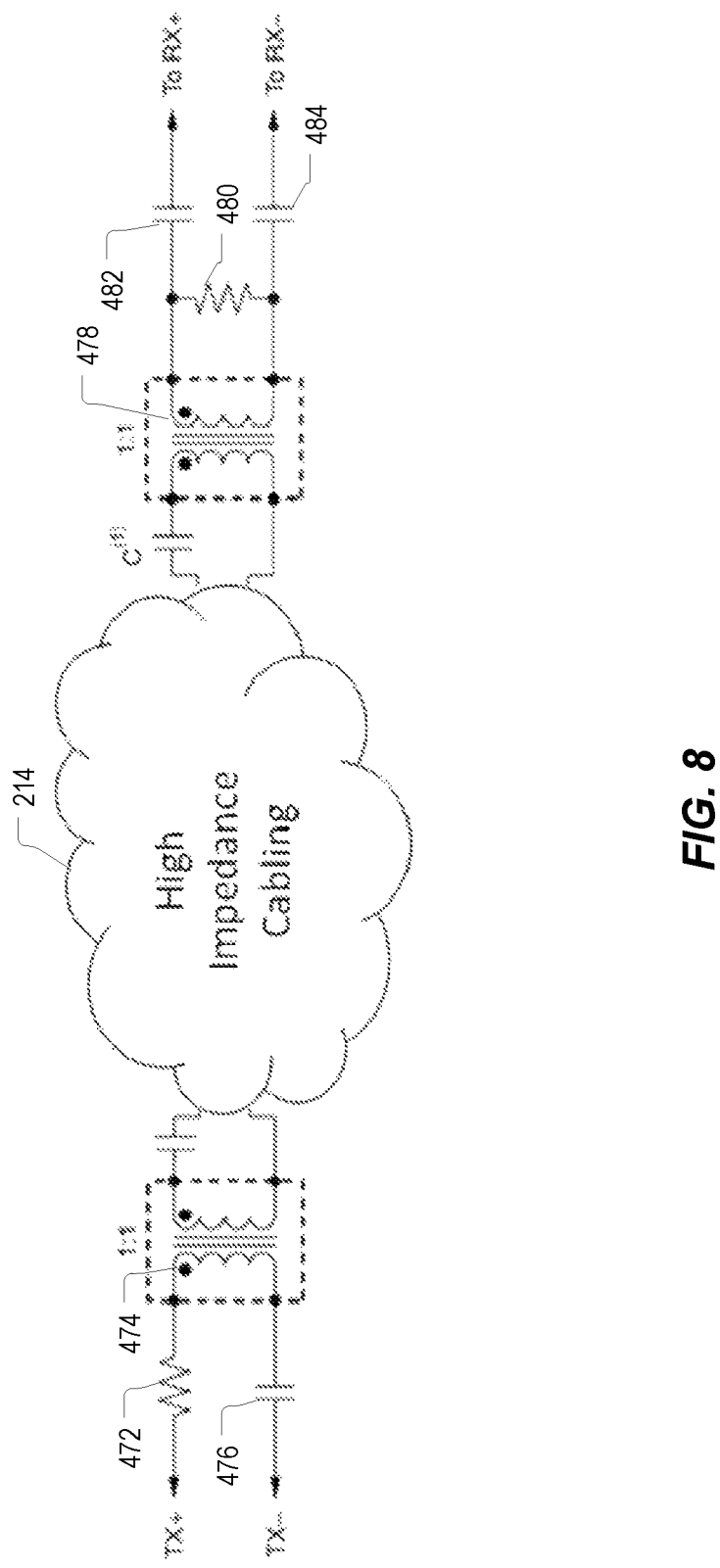
FIG. 8 illustrates an exemplary digital interface with high impedance cabling in accordance with certain embodiments.

Rather than employ a packet based networking scheme, an alternative, in certain embodiments, is to couple a digital signal transport through the high impedance cabling. FIG. 8 shows schematically how an AES3 (or similar) signal could be transmitted to one or more receivers connected to the high impedance cabling. As illustrated, the transmitting device's terminals (TX+ and TX−) are coupled across the primary winding of transformer 474 in series with resistor 472 and capacitor 476. The secondary windings of the transformer 474 are coupled to the high impedance cabling network 214. The secondary windings of the transformer 474 thereby drive the primary windings of another transformer 478, which induces a voltage signal across the receiving device's terminals (RX+ and RX−). The RX+ and RX− terminals are connected across the secondary windings of the transformer 478 in parallel with a resistor 480, and in series with capacitors 482, 484.

Certain embodiments may employ Quality of Service (QoS) mechanisms to provide better service to particular classes of network traffic. QoS techniques similar to Diffserv, IP Type-Of-Service (TOS) and 802.1p/q mark network packets with a field indicating the class of traffic for each packet. When packets are transmitted, packets in a given class may be preferentially transmitted or deferred to reflect a priority or other performance goal for that traffic class. Additionally, network resources may be reserved for certain classes of traffic using a reservation mechanism similar to the IETF RSVP or IEEE 801.Qat network protocols. In Audio Video Bridging (AVB) systems, a combination of resource reservation (802.1Qat) and class based traffic prioritization (802.1Qav) is employed to bound the delay experienced by packets passing through the network. Certain embodiments may employ network QoS mechanisms to bound the delay experienced by media signals or data packets through the network.

Some network technologies (for example, WiFi and HomePlug) employ a shared transmission medium. A device transmitting messages through a shared medium may experience interference from other devices attempting transmission at the same time, or in such a way as the transmissions contend for access to the shared medium. Contention for a shared media may cause variable delays or possibly packet loss. To avoid these problems, one or more time periods can be allocated for each transmitter, in which the transmitter has exclusive access to the shared medium, therefore eliminating the possibility of contention. Certain embodiments may employ a network technology supporting contention-free periods of transmission to bound the delay experienced by media signals or data packets through the network. In HomePlug/IEEE1901 and G.hn networks, packet transmission may be scheduled to occur during "contention free periods", avoiding additional jitter and delay associated with contended access to the transmission medium. Certain embodiments may employ a resource reservation protocol to allocate time slots in contention free periods.

In some networking technologies (for example, WiFi, HomePlug and G.hn), it is more efficient to transmit larger packets rather than smaller packets. To achieve increased efficiency, certain embodiments may bundle several signals together for transmission in a packet stream. Further, such networking technologies may have low maximum packet transmission rates. Some embodiments may use compression in combination with bundling of signals to further reduce the packet transmission rate.

In some networking technologies (for example, WiFi, HomePlug and G.hn), transmission of unicast messages is more reliable than the transmission of multicast messages due to an Automatic Repeat Request (ARQ) protocol operating at the MAC layer. Certain embodiments may therefore convert multicast messages to unicast messages before transmitting them to their intended recipients.

As an alternative, some networking protocols offer methods to improve the reliability of a multicast transmission to all members of the multicast group. These methods typically limit the number of receivers that can be actively receiving messages in a single multicast receiver group. Certain embodiments may use multiple acknowledgements to improve the robustness and reliability of multicast message transmission.

Several networking technologies offer flexibility in the definition of the physical layer protocols and methods. Many parameters (such as the number of OFDM carriers, guard intervals etc) are adjustable to suit different operating channel characteristics. Certain embodiments may select different values for physical layer parameters Packet based networking technologies may experience loss from time to time. In some cases, the rate of loss is sufficiently low that it can be ignored. Acknowledgement and retransmission of packets can be used to mitigate the effects of packet loss, at the cost of additional latency. Alternatively, packet loss can be mitigated using forward error correction (FEC) techniques, where redundant data is added to a stream of packets to allow recovery from one or more missing packets in the stream. FEC is advantageous since less latency is incurred when compared to acknowledgement and retransmission of missing packets. Certain embodiments may employ packet retransmission or forward error correction to mitigate packet loss.

Figure 9:
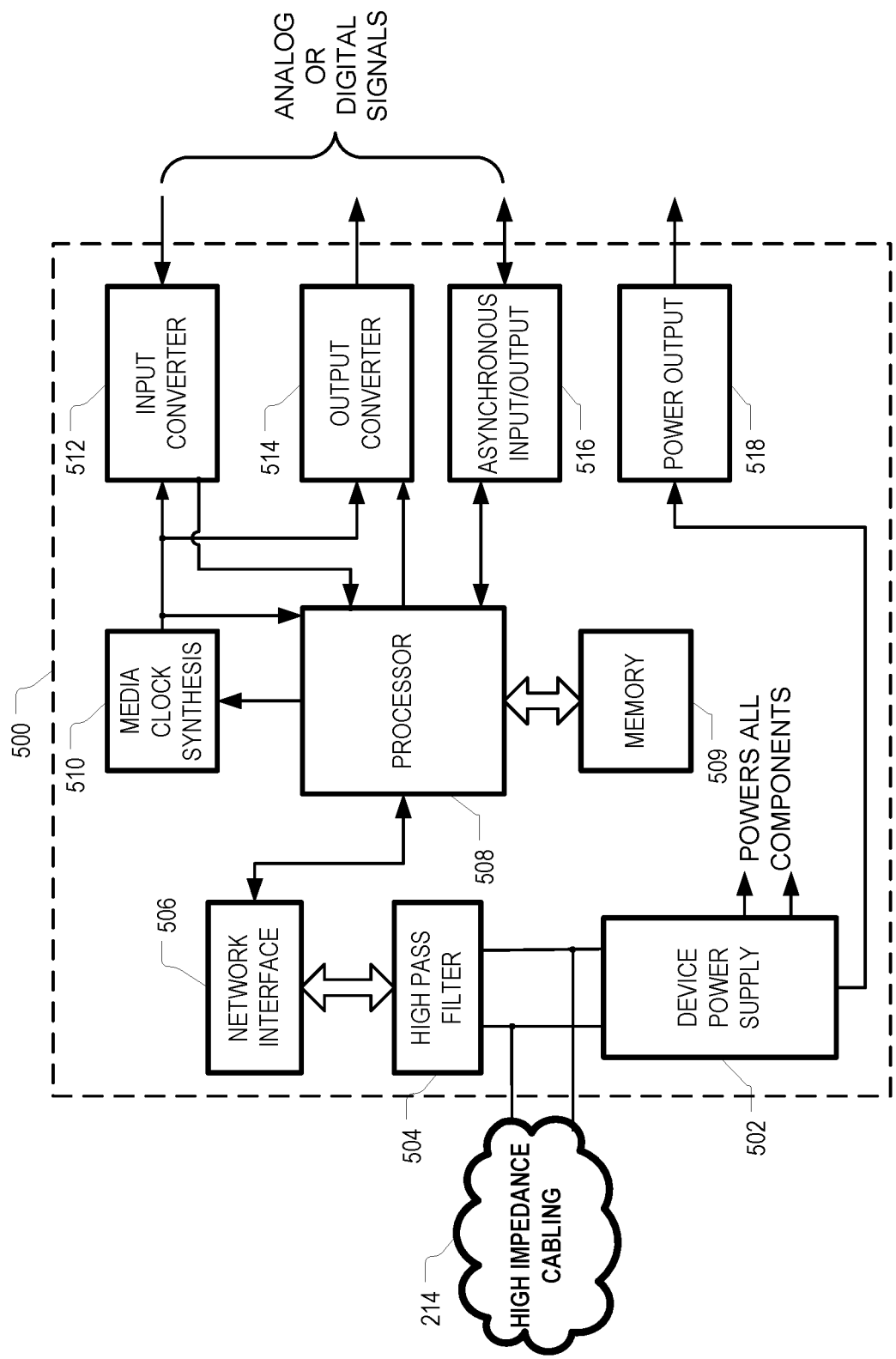
FIG. 9 illustrates an exemplary input/output device schematic in accordance with certain embodiments.

FIG. 9 shows a block diagram of an I/O device 500 that connects to the high impedance cabling 214. This device 500 receives power from the high impedance cabling, either in AC or DC form. The device power supply 502 powers the circuitry inside the device. Power may optionally be supplied to an external device (for example, an IP camera or telephone handset) via power output 518.

Signals travel over the high impedance cabling using digital networking. The high pass filter 504 couples the network interface 506 to the high impedance cabling 214 and the network interface 506 transfers packets or digital signals to/from the cabling to the processor 508.

The processor 508 may be implemented with any suitable processing system, which may include one or more processing units that may be co-located or distributed and that are configured (e.g., programmed with software and/or firmware) to perform the functionality described herein, wherein the processing system can be suitably coupled to any suitable memory (e.g., RAM, Flash ROM, ROM, optical storage, magnetic storage, etc.). For example, the processor 508 may be a microprocessor executing software, as firmware running on an embedded microprocessor/microcontroller, or alternatively as an ASIC, FPGA or silicon chip containing digital logic. The processor also accesses a memory 509 for storing and retrieving data and instructions. The memory 509 may be any suitable type of memory such as, for example, DRAM or SRAM.

The processor 508 controls a media clock synthesizer 510 to provide a media clock that is related to the networked digital signal in frequency or in phase, or both. The media clock is used to drive input converter 512 and output converter 514 interfaces, such as analogue to digital converters, digital to analogue converters, audio or video digital interfaces like the Digital Visual Interface (DVI) interface, AES3/IEC 60958, etc. In some embodiments, it may be beneficial to govern the media clocks such that they are both rate and offset synchronized to a clock that is coupled to a master clock by means of a network time protocol, or to some other clock signal in the network. An example of the synchronization of media clocks is disclosed above and in U.S. Pat. No. 7,747,725. Media clock signal synchronization facilitates time alignment of signal or event data playout and capture, and additionally facilitates low latency operation by allowing buffering at the receiver to be minimized.

The processor may also send and receive asynchronous input/output signals via an asynchronous I/O interface 516, such as RS232 serial data, Musical Instrument Digital Interface (MIDI) events, Ethernet packets, or other signals that do not require a media clock signal. These output signals are "asynchronous" in the sense that they do not require a media clock signal for interfacing. Intermittent or event based signals can be supported with this interface.

Input analogue or digital signals are transmitted into the digital network running over the high impedance cabling. Output analogue or digital signals are received from the digital network running over the high impedance cabling.

A PoE capable Ethernet output interface may be provided by combining "unclocked" Ethernet I/O with power output 518 together in a single interface.

Figure 10:
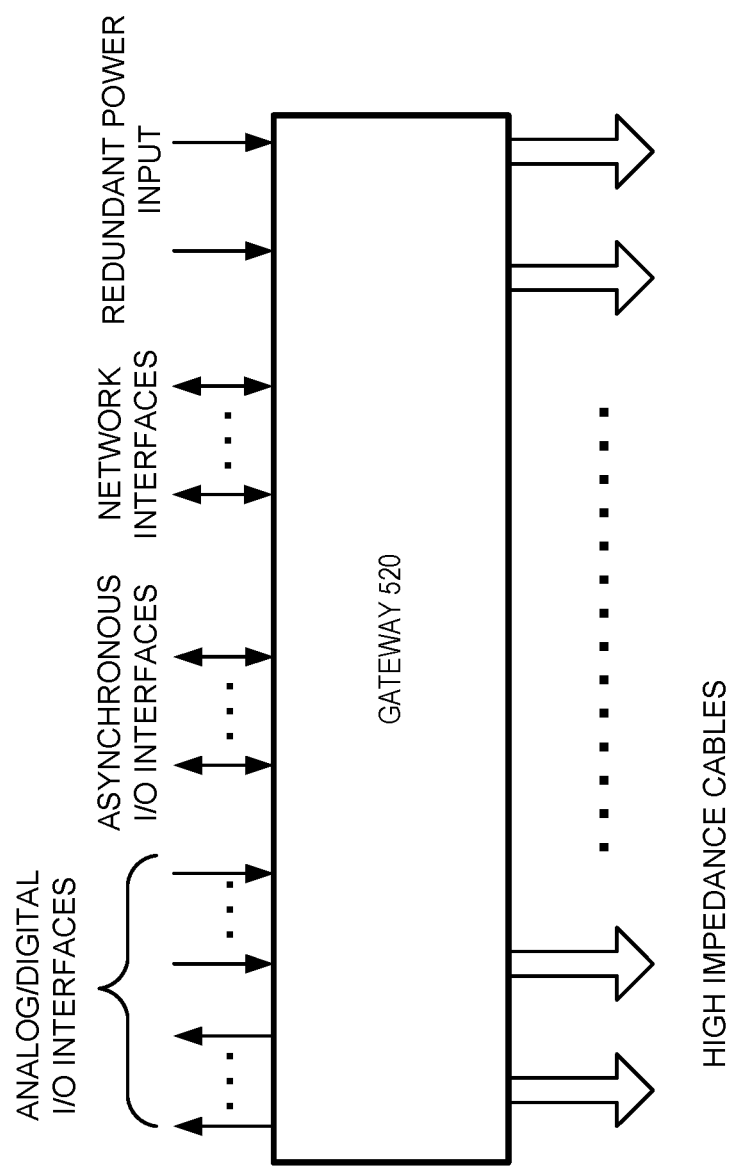
FIG. 10 illustrates an exemplary gateway device schematic in accordance with certain embodiments.

FIG. 10 shows the connections and interfaces on an exemplary gateway device 520. The gateway device 520 transfers signals between various analogue, digital, asynchronous and network I/O interfaces and the digital network running over one or more high impedance cables connected to the gateway.

In certain embodiments, the asynchronous I/O interfaces may include an Ethernet, WiFi wireless, TCP/IP, other packet based network interfaces or combinations thereof. A network I/O interface may be used to transfer signals through the gateway in packetized form to/from other networked devices not attached to the high impedance cabling. The gateway device 520 may also include connections for redundant power input.

Figure 11:
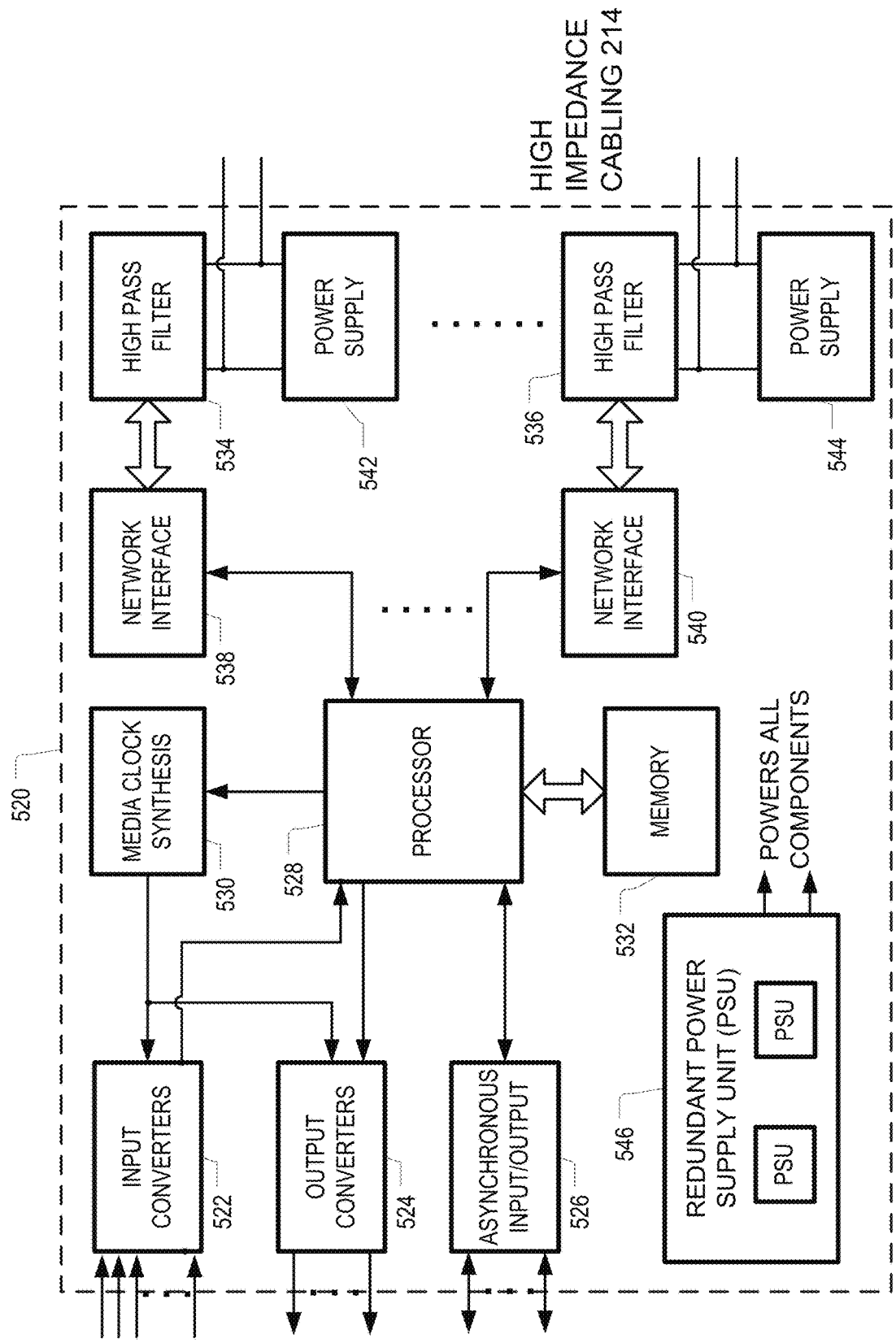
FIG. 11 illustrates an exemplary gateway device schematic in accordance with certain embodiments.

FIG. 11 shows an internal block diagram of an exemplary gateway device 520. The internal structure is similar to that of an I/O device, however the gateway device 520 will typically have more input and output connections. In particular, a gateway will likely support multiple high impedance cable connections, where each connection, or a portion of the cable connections, is supplied power and a network signal. In certain aspects, either a single non-redundant power supply and/or redundant power supplies may be used.

Similar to the I/O device 500, the gateway device 520 receives and transmits data via input converter 522 and output converter 524 interfaces, such as analogue to digital converters, digital to analogue converters, audio or video digital interfaces like the Digital Visual Interface (DVI) interface, AES3/IEC 60958, etc. Asynchronous I/O interface 526 is configured to send and receive asynchronous data.

A processor 528 controls a media clock synthesizer 530 to provide a media clock that is related to the networked digital signal in frequency or in phase, or both. The media clock 530 drives the input and output converter interfaces 522, 524. The processor 528 may be implemented as a microprocessor executing software, as firmware running on an embedded microprocessor/microcontroller, or alternatively as an ASIC, FPGA or silicon chip containing digital logic. The processor also accesses a memory 532 for storing and retrieving data and instructions. The memory 532 may be any suitable type of memory such as, for example, DRAM or SRAM.

Signals travel over the high impedance cabling using digital networking. The high pass filters 534, 536 couple the network interfaces 538, 540 to the high impedance cabling 214 and the network interfaces 538, 540 transfer packets or digital signals to/from the cabling to the processor 528. The gateway device 520 also distributes power over the high impedance cabling 214, either in AC or DC form via power supplies 542, 544. Power may be supplied to the components of the gateway device 520 by a redundant power supply unit (PSU) 546 that receives power from mains power supply, batteries, a generator or combinations thereof.

Even though digital networking interfaces like SDI and AES3 are typically used as point-to-point connections, it is possible that several outputs receive the same data or media signals from the network interface connection, supporting fan-out of data or signals to many devices attached to the high impedance network. Usage of a point-to-point networking interface over the high impedance network may limit the number of distinct signals that can be provided. When using a packet switched networking interface such as HomePlug over the high impedance cabling, several cable segments may form a single HomePlug network domain, in which all the devices, or a substantial number of the devices, in the domain can communicate with each other. In certain embodiments, a more flexible approach is to treat each high impedance cable, or a portion of them, as a standalone network. The processor can then manage the mapping of data or signals onto network interfaces. Sub-dividing cable segments into several domains may be beneficial for minimizing congestion and/or contention in the network.

Figure 12:
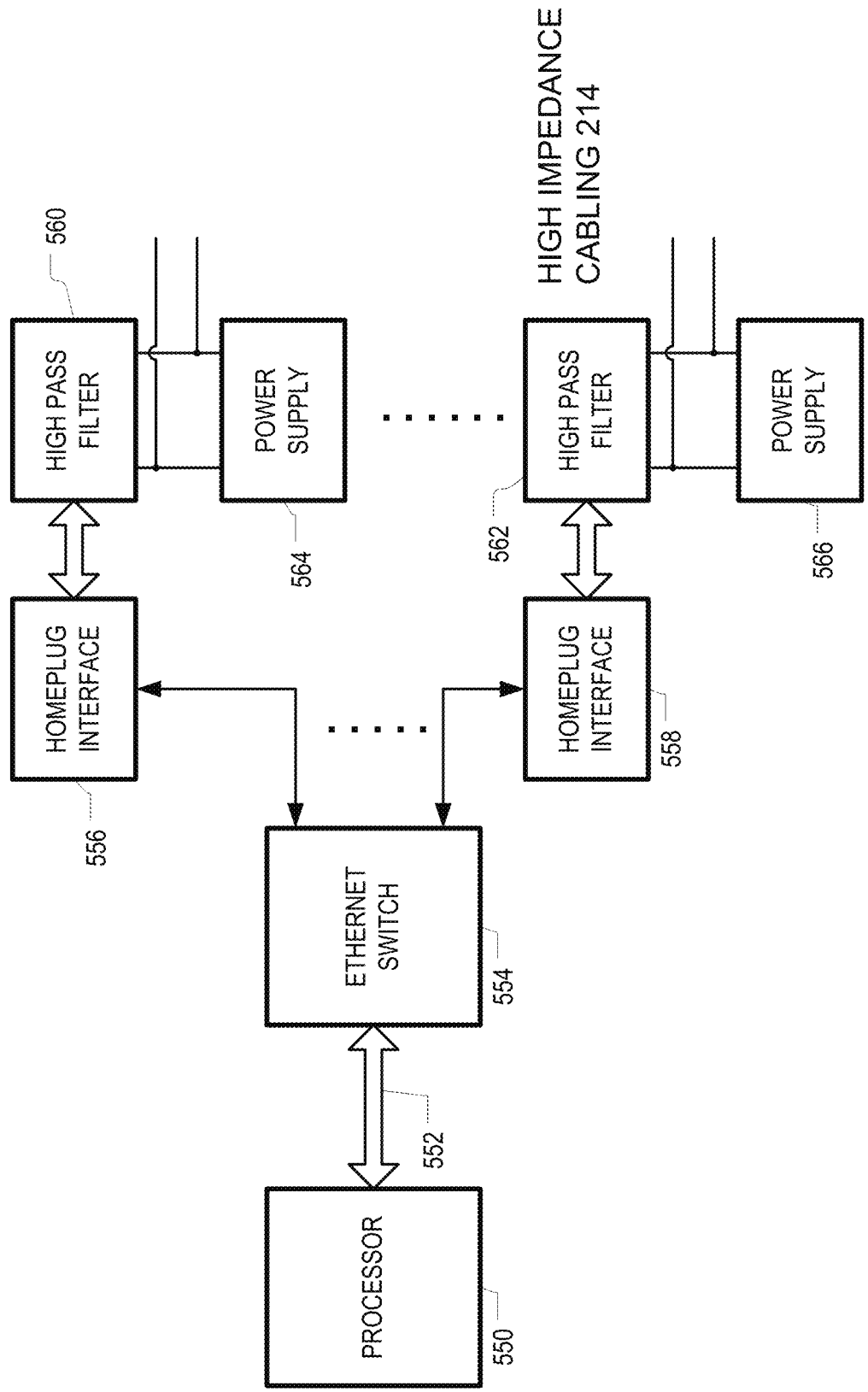
FIG. 12 illustrates an exemplary gateway device schematic with an Ethernet switch in accordance with certain embodiments.

Since it is not typical for processors to have large numbers of network interfaces, an Ethernet switch chip can be used to connect a single processor Ethernet MII interface to several powerline network interfaces. FIG. 12 shows how a single Ethernet network interface on an exemplary processor 550 in an exemplary gateway device can be connected to many HomePlug powerline networking interfaces. The Ethernet link 552 between the processor 550 and the Ethernet switch 554 may employ Virtual LANs (VLANs), allowing the processor to treat each HomePlug interface 556, 558 as a separate network. The HomePlug interfaces 556, 558 transmit and receive data over the high impedance cabling 214 via high pass filters 560, 562. Power supplies 564, 566 also connect to the high impedance cabling 214 for supplying power.

Figure 13:
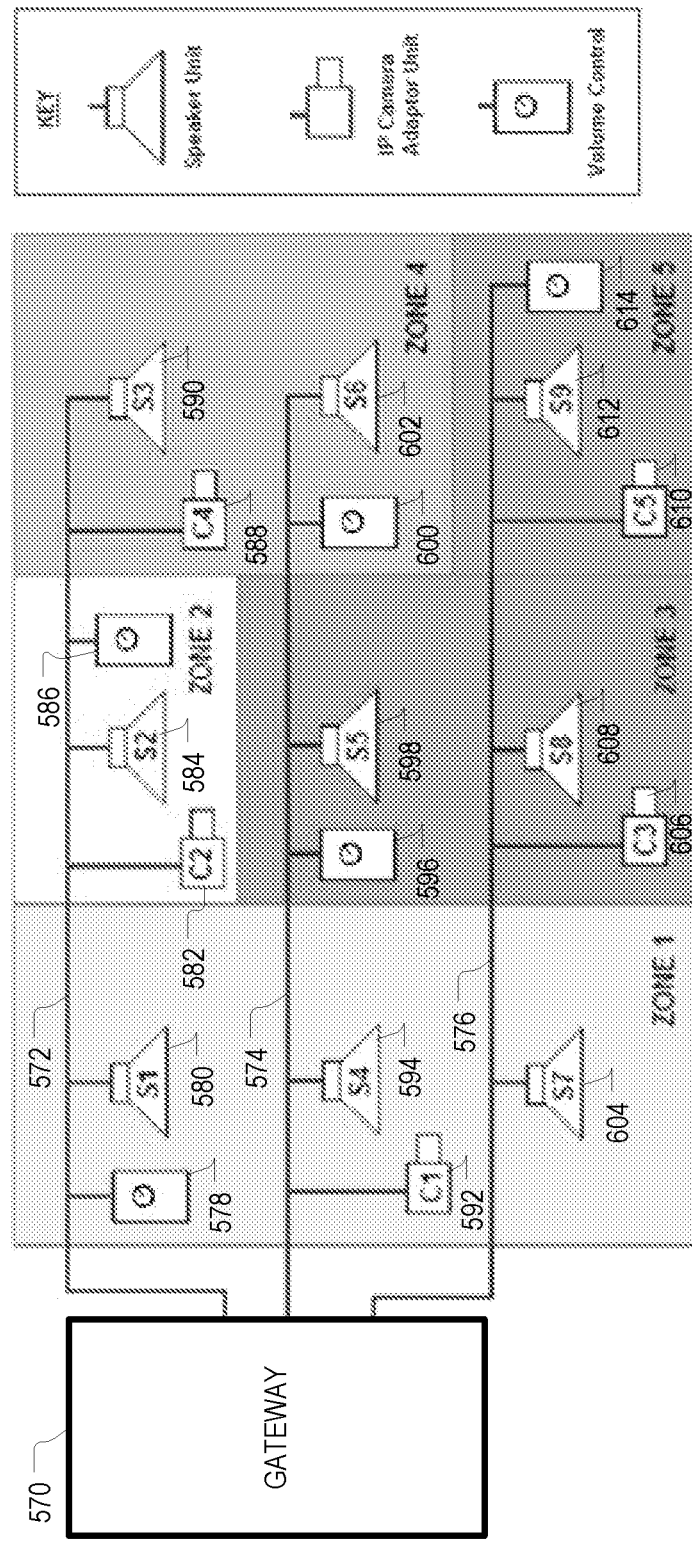
FIG. 13 illustrates an exemplary zoned system schematic in accordance with certain embodiments.

FIG. 13 illustrates an exemplary system divided into five logical zones (Zones 1 through 5), which is controlled by a single gateway device 570. Each zone represents a location containing one or more devices to which data or media signals can be transmitted and/or received. For example, zones may be used in a building with several rooms or an airport terminal with several buildings, terminals and gates. A large room or airport terminal may have several speakers or displays and the speakers in that room typically play out the same audio. From a management point of view, signals are conceptually routed to a zone and a management system ensures that signals are appropriately routed to each individual I/O devices making up that zone. Many audio/visual systems including those used in airports, railways, conferencing systems and public address systems use zones to simplify routing of background music, paging messages, announcements or other content various locations. Zones may overlap one another and be formed by the union of several sub-zones.

FIG. 13 shows several zones as a logical overlay over physical cabling and shows that the structure of the zones is not required to follow physical cabling topology. Three high impedance cables 572, 574, and 576 are attached to the gateway device 570. The first high impedance cable 572 connects to: a volume control 578 and a speaker 580 in Zone 1; an IP camera adapter unit 582, a speaker 584, and a volume control 586 in Zone 2; and an IP camera adapter unit 588 and speaker 590 in Zone 4; all of which are connected in a daisy chain topology. The second high impedance cable 574 connects to: an IP camera adapter unit 592 and a speaker 594 in Zone 1; a volume control 596 and a speaker 598 in Zone 3; and a volume control 600 and speaker 602 in Zone 4; all of which are connected in a daisy chain topology. The third high impedance cable 576 connects to: a speaker 604 in Zone 1; an IP camera adapter unit 606 and a speaker 608 in Zone 3; and an IP camera adapter unit 610, speaker 612, and volume control unit 614 in Zone 5; all of which are connected in a daisy chain topology.

By way of contrast, the speakers connected to a cable segment in a constant voltage audio system receive the same program material. Certain embodiments have the advantage that a single cable may support several zones where each zone may receive or transmit distinct data or program material. The use of zones does not preclude routing signals to specific I/O devices. In some systems, a zone may be distributed across several geographical locations, for example departure and arrival information video signals or data may be sent to screens in a zone that is geographically spread throughout an airport.

Figure 14:
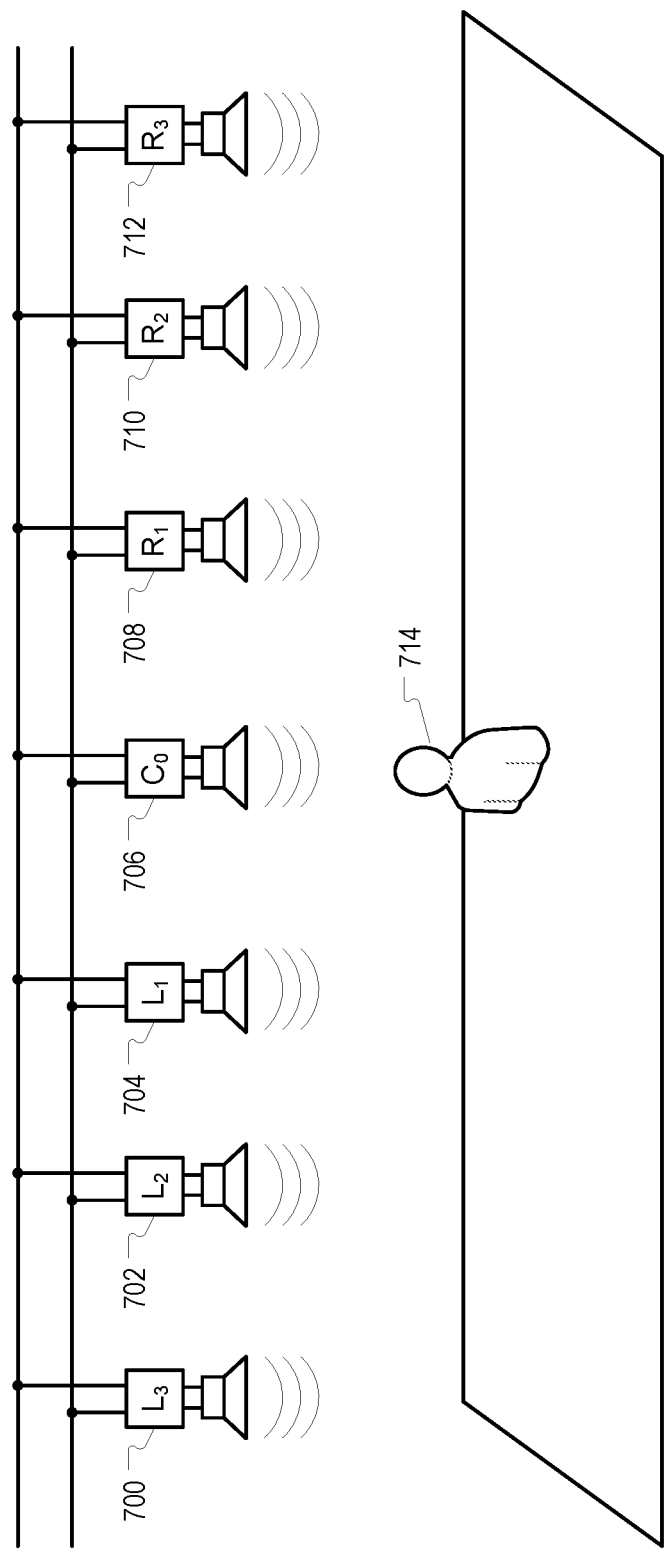
FIG. 14 illustrates an exemplary system including multiple loudspeakers having synchronized output in accordance with certain embodiments.

FIG. 14 illustrates an exemplary system of seven loudspeakers 700, 702, 704, 706, 708, 710, 712 configured to playout out audio in a synchronized fashion. Each loudspeaker receives a media signal via the network interface and is powered via the high impedance cable. Synchronization between loudspeakers may be facilitated by means of a shared time base provided by a network time protocol and/or the methods described in U.S. patent Ser. No. 11/409, 190 and PCT Application No. PCT/AU2008/000656. In some applications, the audio signal may be simultaneously by all speakers in the zone (Ln, C0, Rn). In other applications, it may be advantageous to delay audio playout at certain speakers with respect to a reference location. For example, audio playout may be progressively delayed the further the speaker is from a central location—if the loudspeaker 706 ($C_0$) is the central location, then the outermost loudspeakers 700, 712 ($L_3/R_3$) have the longest delay, loudspeakers 702, 710 ($L_2/R_2$) have a medium delay, loudspeakers 704, 708 ($L_1/R_1$) have a small delay and loudspeaker 706 ($C_0$) has no delay as perceived by a person 714 in the center of the speaker array.

Figure 15:
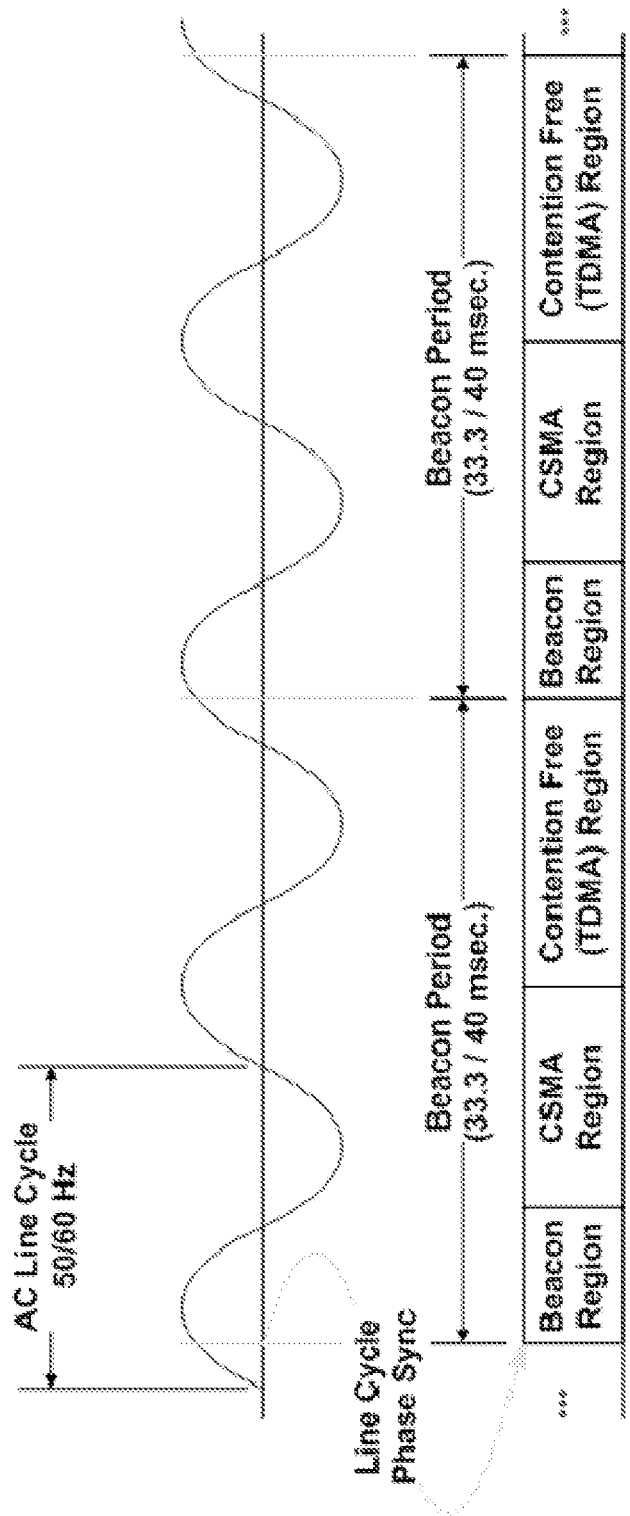
FIG. 15 illustrates an exemplary periodic cycle of a Homeplug beacon period including events that may occur during normal MAC operation.
Figure 16:
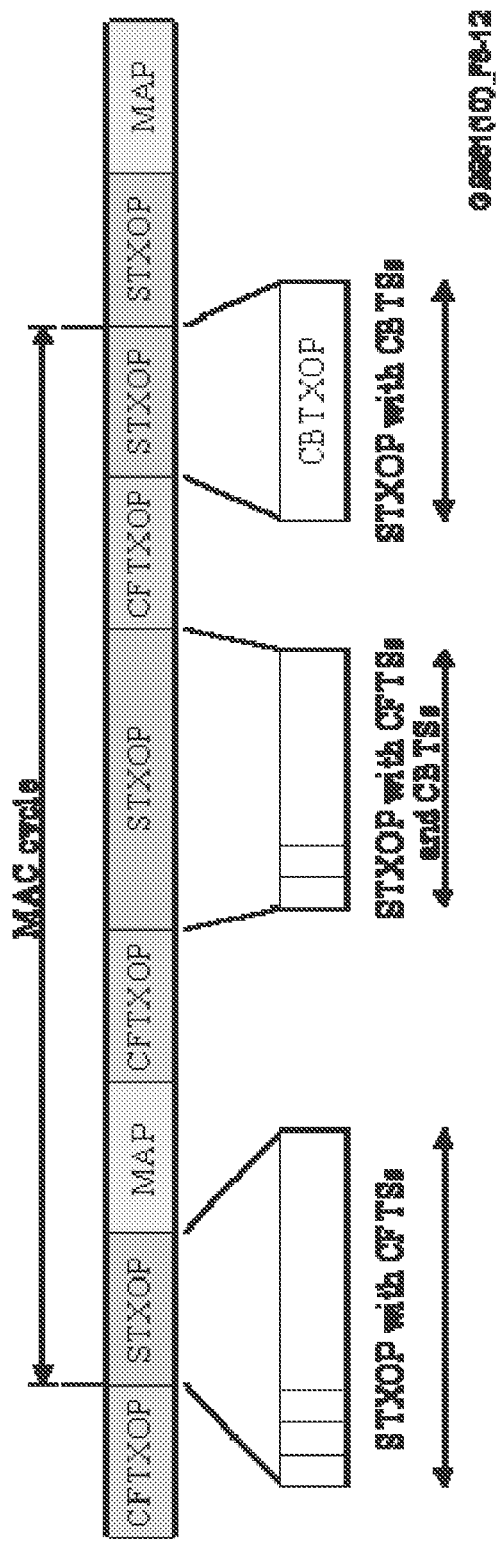
FIG. 16 illustrates an exemplary periodic cycle of a G.hn MAC protocol including events that may occur during normal MAC operation.

FIGS. 15 and 16 illustrate exemplary periodic cycles of the HomePlug beacon period and G.hn MAC protocol, respectively. When using AC power, these cycles may be synchronized to the AC power cycle, as shown in FIG. 15. FIGS. 15 and 16 further illustrate events occurring during normal MAC operation that may be utilized to improve clock synchronization performance.

Certain embodiments may employ one of the IEEE 1588 family of clock synchronization protocols, or a substantially similar protocol. In such protocols, timestamps may be exchanged between a master clock and a slave clock as shown in FIG. 17.

Figure 17:
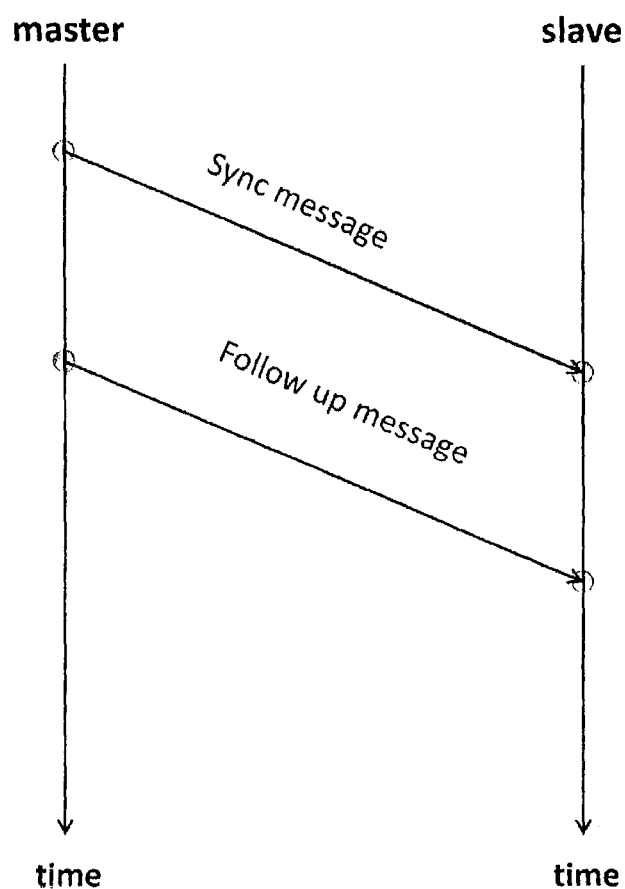
FIG. 17 illustrates an exemplary timestamp exchange between a master device and a slave device.

In FIG. 17, the master clock transmits a sync message to one or more slave devices. The time of transmission $t_m$ is recorded by taking a timestamp with a local clock in the master device. The sync message may or may not contain the master timestamp $t_m$. When sync message do not contain $t_m$, a followup message containing $t_m$ may be transmitted passing the value of $t_m$ from the master to the slave device(s). Slave devices timestamp the arrival of sync messages, shown as $t_s$ in the diagram. In this diagram, the transmission of the sync message acts as a shared event that is timestamped by the master and slave devices using their local clocks. When the slave device receives a followup message or a sync message containing $t_m$, it has timestamps for the same event at the master and at the slave. These two timestamps ($t_m$, $t_s$) may be used to adjust the slave clock such that it is synchronized with the master clock.

In FIG. 17, an event which is shared between the master and the slave (the sync message transmission) is timestamped at the master and at the slave. In certain embodiments, the master and slave timestamps of that shared event may be used to adjust the slave clock such that it is synchronized to the master clock. Certain embodiments may timestamp events shared between the master and slave devices that are neither PTP sync messages nor network time protocol messages, whilst using the master and slave timestamps of the shared event to adjust the slave clock such that it is synchronized with the master clock. Shared events that may be useful for this purpose include, but are not limited to:

The start of the HomePlug Beacon Period,
The start of a G.hn MAC cycle,
The transmission/reception of a G.hn MAP packet.

In certain embodiments, it may not be required that the shared event used to generate timestamps occur with a regular frequency provided that enough timestamps are available to the slave(s) to ensure adequate clock synchronization.

Figure 18:
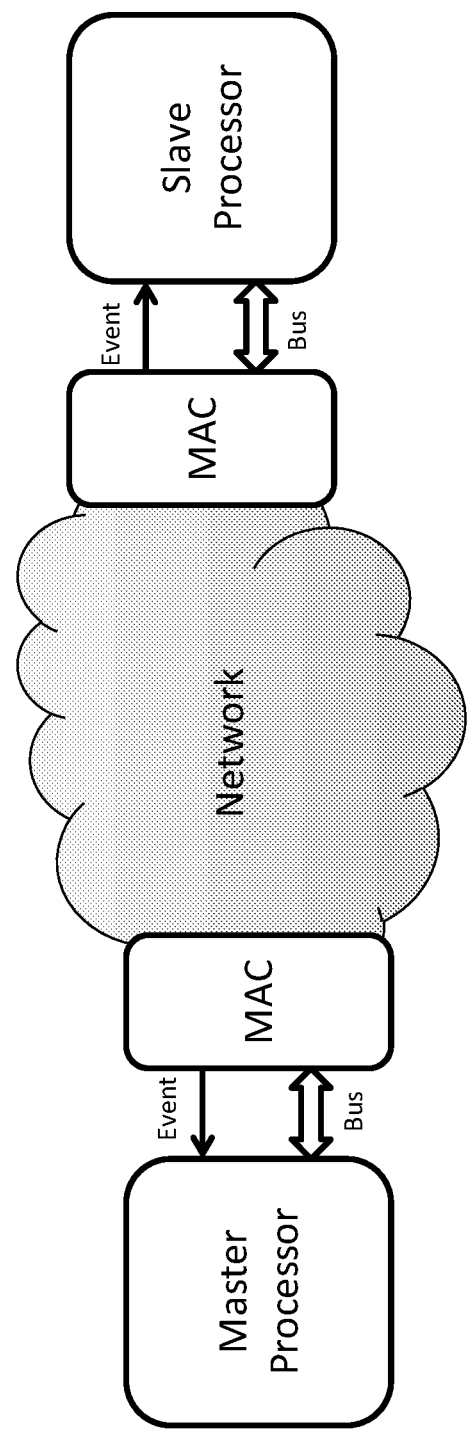
FIG. 18 illustrates an exemplary relationship between master and slave processors connected to a shared network.

FIG. 18 schematically illustrates the relationships between the elements of an exemplary embodiment. As shown in FIG. 18, master and slave processors are connected to a shared network via a MAC layer and the master can transmit messages containing timestamps through the network to the slave.

An event (for example, the beginning of each G.hn MAC cycle) may be chosen as the shared event to be timestamped by both master and slave devices. The MAC indicates the occurrence of the event to an attached processor by means of the Event signal. The Event signal may be implemented in several ways, including but not limited to: GPIO pin, interrupt pin, SPI port, RS232 port or I2C port. In certain embodiments, if the Event signal contains a single bit of information (e.g. a single GPIO pin), the attached processor may take a timestamp using its local clock. If the event signal supports several bits of information, a timestamp may be passed from the MAC to the attached processor. For example, G.hn timestamps are 32 bits with a 10 ns resolution and may be passed to the processor when each event occurs. Timestamps generated by the MAC may need to be converted to the timebase of the attached processor before transmission or use in synchronization algorithms.

Each shared event that occurs is timestamped by the master processor and a message containing the timestamp is transmitted to one or more slave processors via the network. Messages containing timestamps may also contain additional information identifying the specific event associated with the timestamp, such as sequence numbers, addresses or similar information. Messages transmitted and received through the network may pass across the "Bus" connection between the processor and directly attached MAC.

The shared events that occurs may also be timetamped by the slave processors. When the slave processor receives a message from the master processor containing a timestamp for a shared event, the master timestamp contained in the message and the matching slave timestamp may be used to synchronize the slave clock with the master clock. In summary, the slave processor has a local timestamp and a master timestamp for an event that is shared between the master and the slave.

Certain embodiments may also share information between system components or protocol implementations where information gathered in the operation of one system protocol may have practical benefit optimizing or otherwise improving the performance of another system component. By way of example, IEEE1588 messages may be multicast and are usually received by all devices in the system through their participation in the protocol. Parameters such as loss rates or failed multicast reception rates, or observed signal to noise ratios using the IEEE 1588 traffic arriving at each receiver can be communicated back to a controlling node via unicast. This information may be used to scale the number of devices required to participate in a multicast receiver group that is utilizing multiple acknowledgements. In this case channel performance information derived from IEEE1588 messaging may be used to select representative devices and may allow a controller to statistically minimize the number of devices required to acknowledge a multicast transmission, and therefore minimize the overhead required by the multicast acknowledgement process. In this case devices that are determined to be the most representative or most likely to suffer loss of a multicast transmission than other members of the group and therefore well placed to acknowledge on behalf of the multicast group. In certain embodiments, this has the effect of allowing devices to participate in the multicast receiver group without being required to transmit acknowledgements. Many such examples are possible within embodiments of a system.

The physical layer employed in many communications technologies is based on orthogonal frequency division multiplexing, or variations on the multicarrier concept. Physical layer parameters associated with the OFDM physical layer of typical systems are generally not defined as fixed values, and therefore may be adjusted to suit the media and associated transmission channel. Parameters that are adjustable may typically include, but are not limited to:
  Baseband bandwidth and RF channel
  Number of OFDM subcarriers and subcarrier frequency spacing
  Modulation schemes
  Guard intervals In certain embodiments, the parameters may allow a range of possible values, with a preferred value based on the application of the current embodiment. In certain embodiments, the operating value may be selected considering the performance of the transmission channel with respect to parameters such as, but not limited to attenuation, impulse response, delay spread etc.

Typical baseband values range from 12.5 MHz up to 400 MHz. Lower values are utilized in a lower quality transmission channel (i.e. one with higher frequency and time selectivity—such as legacy power line cabling), higher values are possible in cleaner transmission channels (i.e. on with lower frequency and time selectivity such as properly terminated coaxial cable.) A typical value for a lower quality transmission channel is in the region of 25 Mhz. A typical value for a higher quality transmission channel is in the region of 100 MHz, The number of OFDM subcarriers in a typical system may range between 64 up to 8192, with a typical value in the region of 1024. Carrier spacing values are linked to the number of subcarriers and baseband bandwidth in use. Values may range from approximately 12 kHz up to approximately 400 kHz, with a typical value in the region of 24 kHz in poor transmission channels that require lower baseband bandwidths, and a typical value in the region of 200 kHz for higher quality transmission channels that allow higher baseband bandwidths.

The modulation scheme may be varied based on the received signal to noise ratio, and increased as high as possible to maximize the possible data rate in the current channel conditions.

Guard Intervals are selected based on the time delay spread of the channel, and may be necessary to handle reflections, inter symbol interference, and/or other time selective behavior in the transmission channel. In parameterized systems, values are typically measured in samples (defined by the nyquist rate required to receive the full baseband signal) and range in value from 8 up to 1024. Guard Intervals may be made shorter in higher quality channels and longer in lower quality channels.

Certain embodiments of this approach allow multiple physical media to be used in a single system. Multiple transceiver implementations allow different cabling options with separate parameter sets used for each cabled interface. In cases where multiple physical communication paths exist between a transceiver pair (via different transmission channels), many algorithms are possible to determine which path would be utilized. Examples include, but are not limited to:
  The faster network is employed
  Load balancing is employed by the transmitter, and the lowest loaded link is employed
  The connection minimizing overall latency is employed The selection of which transceiver is utilized may be performed on short or longer timescales. A short timescale may allow the device to utilize any of its available transceiver interfaces on a packet by packet basis. A longer timescale may be utilized to establish reservations on any available links on which data traffic may be multiplexed. The details of each reservation may be determined by some of the characteristics outlined above.

In certain embodiments, the system may be deployed into a "brownfield" environment in which existing cabling infrastructure is used alongside newly installed and optimized cabling. In such an embodiment, the system may utilize the physical layer parameters appropriate for each media, wherein the pre-existing cabling may use a more robust, lower performance configuration and the optimized cabling may employ a higher performance configuration. In one embodiment, pre-existing cabling may include, for example, incorrectly terminated "figure 8" fire rated speaker cable, or poorly terminated existing power system cable. Optimized cabling may include properly terminated twisted figure-8 speaker cabling. This embodiment may be important for deployment of practical systems as it provides flexibility in how a system may be installed into existing building infrastructure.

Embodiments of the present disclosure may be used in a variety of applications. For example:
Audio signal distribution system
  Microphone, line, analogue or digital inputs+amplifiers, speakers, analogue or digital outputs
  Microphones or sensors connected to the 70V wiring
Video signal distribution system
  Panels/displays connected to 70V wiring
  Cameras connected 70V wiring
Mixed Audio/Video distribution
  Speakers, microphones, displays
System with controls
  Controls (e.g., local volume control at the speaker, audio source, etc.)
  Volume control widget connected to the network
  Control of (e.g. volume) via the network
Digital networked zoning Certain embodiments may have one or more advantages over a conventional low impedance speaker system, including, for example:
Simplified cabling: physical cabling topology can be designed for maximum convenience without sacrificing zoning flexibility. A single cable can support more than one zone. In some cases, less cabling may be required since it can follow a more natural installation path.
Timing control: The timing of signal playout or capture can be controlled on a per-device basis. Timing between devices may be coordinated to improve intelligibility, quality, or sensitivity of the system. Time alignment between audio and video signal capture/playback is simplified.

Multiple power levels: Fine control over sound pressure level targets can be achieved at different listening areas. Adjustment of the audio level can be carried out by the processor in the device and without requiring physical access to transformer taps. Adjustments in level can be much finer than is typically supported via transformer taps.

Less expensive: power losses are reduced resulting in lower operating costs, cabling may be reduced in size due to power savings or reduced in length due to the ability to easily define logically zones. Devices using power electronics may be smaller and lighter, making them simpler to install and transport.

Certain embodiments of the present disclosure may obviate certain disadvantages of conventional constant voltage speaker systems, such as:

Frequency Response: Inexpensive transformers may have poor reproduction of low and high frequencies. Since signals in certain embodiments are transmitted in digital form, they are not subject to the frequency distortions which trouble analogue systems. In certain embodiments, transformers may not require a wide frequency range or even good linearity and may be optimized for power distribution at a specific frequency. Low and high frequency response at the same power level may be significantly improved.

Distortion: Overdriven transformers can add ringing distortion to the audio signal. Low cost transformers are prone to distortion at higher power levels, especially with regard to low frequency response. Low-level signals can fail to energize a poorly designed transformer core enough to prevent higher than normal amounts of harmonic distortion. As disclosed herein, transformers in certain embodiments need not have a wide frequency response.

Variation: Unit-to-unit variation can be observed in poorly made transformers. Electronics used in power conversion and signal interfacing can be made with considerably less variation than physical transformers.

Delay: More distant speakers on the same cable in a constant voltage audio system cannot be easily delayed to match the speed of sound in air so that the impulses from a string of loudspeakers arrive at the same time from the point of view of a distant listener. In certain embodiments, each loudspeaker may be driven with a distinct signal. This signal may be delayed or otherwise processed as necessary. In certain embodiments, output devices may contain a delay element, allowing playback of a signal transmitted to many speakers with differing delays.

Insertion loss: The transformers themselves commonly reduce total power applied to the loudspeakers, requiring the amplifier to be some ten to twenty percent more powerful than the total power that is intended to be applied to the loudspeakers. Typical transformer insertion loss measurements are taken at 1,000 Hz in order to make the transformer's specifications appear as good as possible. Using this method, typical insertion losses are about 1 dB, a 20% power loss. Most of the power in voice-application audio systems is below 400 Hz, meaning that insertion loss at lower frequencies would be greater. Good quality transformers reduce mid-band frequencies by 0.5 dB (approximately 10% power loss) or less, resulting in a ten watt loudspeaker drawing 11.1 watts from the amplifier. In certain embodiments, decoupling of signal and power distribution combined with the use or power electronics will essentially eliminate, or substantially reduce, significant insertion loss for DC or AC powered loudspeakers. Signals are transmitted digitally with low power.

Capacitance: To achieve higher power levels, transformers must be physically larger. Large transformers (above 200 watts) begin to suffer from high frequency attenuation due to self-capacitance. The use of power electronics in certain embodiments may eliminate or reduce this effect. Digital transmission lessens or substantially prevents capacitance from affecting the quality of signal distribution.

Expense: If high-power loudspeakers are used with an emphasis on low frequency response, the required transformers will be much larger and will add significant cost to the project. Additionally, in some areas, local building and electrical code requires 70-volt cabling to be carried within conduit, increasing the overall project cost. Higher powered systems using certain embodiments of the present disclosure may require more expensive cabling, however high powered electronics does not require markedly more expense. Low frequency operation may be significantly improved at similar cost.

Moreover, certain embodiments may also have one or more of the following advantages:

Improved speech quality and/or intelligibility compared to analog systems.

Simple daisy chaining, avoiding the difficulties daisy chaining Ethernet (Power over Ethernet is problematic for daisy chains and provides too little wattage to meet the needs of many applications).

Support for retrofitting digital networking to buildings using cabling previously installed for 70/100V analog constant voltage systems.

Solve Power over Ethernet (PoE) power capacity problem for ceiling speakers (cable providing much more power than PoE can be used).

Allow zones to be logical overlays that can be independent of the cabling topology.

Make it possible to re-zone areas via simple software reconfiguration (such as when re-fitting out a floor in a building, or in a hotel/conference center).

In addition, certain embodiments may provide one or more improvements and benefits over conventional systems, including, for example:

Speakers can be individually monitored and alarms can be raised when a unit fails—an important safety standard feature.

Richer features such as ambient noise sensing and level adjustment are possible.

Operating power consumption is reduced, possibly meeting the requirements of relevant standards such as LEED and Energy Star It is as easy to install as traditional analog systems, with little retraining needed.

Lower wiring and installation costs

Certain embodiments may have one or more advantages in comparison to a standard HomePlug system on power cabling, including, for example:

Retrofitting existing loudspeaker installations (e.g., in airports, commercial buildings, etc.) may be easily accomplished with minimal rewiring Speaker cabling vs. power cabling Smallest size power cabling delivers approximately 500 W to a single device. Constant voltage speaker cabling of a similar size delivers power and program material to many lower wattage devices sharing the cable (e.g., ten 50 W devices, or fifty 10 W devices)

Constant voltage speaker cabling almost universally uses a lower voltage than the power cabling, to avoid conduit and other regulatory issues with installation Constant voltage speaker cabling often has longer runs than power cabling, with greater resistive loss Total wattage delivered by a constant voltage speaker cable is usually much less than the wattage delivered by an power cabling (hundreds of watts vs. thousands of watts). This is because the voltage is typically minimized to avoid regulatory issues and the current may also be minimized to reduce resistive loss in the speaker cables.

The exemplary approaches described may be carried out using suitable combinations of software, firmware and hardware and are not limited to particular combinations of such. Computer program instructions for implementing the exemplary approaches described herein may be embodied on a tangible, non-transitory, computer-readable storage medium, such as a magnetic disk or other magnetic memory, an optical disk (e.g., DVD) or other optical memory, RAM, ROM, or any other suitable memory such as Flash memory, memory cards, etc.

Additionally, the disclosure has been described with reference to particular embodiments. However, it will be readily apparent to those skilled in the art that it is possible to embody the disclosure in specific forms other than those of the embodiments described above. The embodiments are merely illustrative and should not be considered restrictive. The scope of the disclosure is given by the appended claims, rather than the preceding description, and all variations and equivalents that fall within the range of the claims are intended to be embraced therein.

The invention claimed is:

1. A device comprising:
   a power supply configured to be coupled to a conductive path in a high-impedance cable;
   a network interface configured to be coupled to the conductive path in the high-impedance cable; and
   a processing system coupled to the network interface, the processing system configured to receive digital data from the network interface, convert the digital data to an analog signal, and output the analog signal to an amplifier, speaker, alarm, actuator, relay closer, serial port, lighting system, video projector or video monitor, wherein the processing system is modulated or controlled by one or more local processors in the device, or by signals or messages transmitted by one or more control processors elsewhere on the network, or by signals or messages transmitted from one or more control devices such as a volume control or switch attached to the device or attached elsewhere to the network;
   wherein the device is configured to be connected to a gateway device by the high-impedance cable, the high-impedance cable having at least two conductive paths, and wherein the device is configured to receives electrical power and digital data from the gateway device via the high-impedance cable over the same conductive path of the high-impedance cable;
   wherein the gateway device comprises a power source and is configured to be connected to a second device by the high-impedance cable wherein the second device is configured to receive power and digital data from the gateway device via the cable over the same conductive path; and
   wherein the power source is configured to provides power to the device and the second devices via the high-impedance cable, and wherein the second device is configured to be connected to the gateway device through the device via a daisy-chain topology;
   wherein the device can individually be addressed via the gateway device; and
   wherein the device comprises a local clock and a media clock and is configured to receive packets of data comprising timestamp information and utilize the timestamp information contained in the packets to coordinate the correct playout time for media signals between the device and the second device.

2. The device of claim 1 wherein:
   a. a third device is connectable to the gateway device by the cable, and wherein the third device receives power and digital data from the gateway device via the cable over the same conductive path; and
   b. a fourth device connectable to the gateway device by the cable, wherein the fourth device receives power and digital data from the gateway device via the cable over the same conductive path within the cable.

3. The device of claim 1 wherein the gateway device is configured, to transmit and receive data, and to transmit power to at least the device and the second devices.

4. The device of claim 1 wherein the digital data is compressed or uncompressed audio or video, control and monitoring data, or a combination thereof.

5. The device of claim 1 wherein the first device is a speaker, video monitor, security alarm, fire alarm, smoke detector, $CO_2$ detector, camera, network adapter, volume control or combination thereof.

6. The device of claim 1 wherein the second device is a speaker, video monitor, or security alarm, fire alarm, smoke detector, $CO_2$ detector, camera, volume control or combination thereof.

7. The device of claim 1 wherein the gateway device transmits power to at least the device and the second device as alternating current.

8. The device of claim 7 wherein a frequency of the alternating current is between 400 and 500 Hz.

9. The device of claim 1 wherein the gateway device transmits power to the at least the device and the second device as direct current.

10. The device of claim 1 wherein the high-impedance cable is a 70V or 100V analog public address cables.

11. The device of claim 1 wherein the device is in a first zone and the second device is in a second zone.

12. The device of claim 1 wherein the device and the second device are in a first zone.

13. The device of claim 2 wherein the device and the second device are in a first zone and the third device and the fourth device are in a second zone.

14. The device of claim 2 wherein the device, the second device, the third device and the fourth device are in separate zones.

15. The device of claim 2 wherein the device, the second device, the third device and the fourth device are configured in zones that are not dependent on a cabling topology.

16. The device of claim 2 wherein the device, the second device, the third device and the fourth device zone location is reconfigured via a software solution.

17. The device of claim 1 wherein the device can be individually monitored.

18. The device of claim 1 wherein the device is configurable to process and use certain data, including at least one of de-compression of digital data, de-compression of audio/video signals, gain adjustment of audio signals, frequency equalization of audio signals, playout time alignment of audio and/or video signals, mixing of two or more audio signals, echo cancellation, triggering of pre-recorded audio/video playback, video scaling, video color adjustment, de-interlacing, de-noising, adjustment of video frame rate, video picture-in-picture processing, and combinations thereof.

19. The device of claim 1 wherein multiple physical media can be used in a single system.

20. The device of claim 1 wherein the processing system is configured to send and receive asynchronous input/output signals via an asynchronous interface such as serial data, Musical Instrument Digital Interface events, Ethernet, WiFi wireless, TCP/IP, or other packet based network interfaces or combinations thereof.

* * * * *